US012062139B2

(12) United States Patent
Cai

(10) Patent No.: US 12,062,139 B2
(45) Date of Patent: Aug. 13, 2024

(54) VIRTUAL SCENARIO GENERATION METHOD, APPARATUS AND DEVICE AND STORAGE MEDIUM

(71) Applicant: TENCENT TECHNOLOGY (SHENZHEN) COMPANY LIMITED, Shenzhen (CN)

(72) Inventor: Jiarun Cai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 89 days.

(21) Appl. No.: 17/985,639

(22) Filed: Nov. 11, 2022

(65) Prior Publication Data
US 2023/0071213 A1    Mar. 9, 2023

Related U.S. Application Data

(63) Continuation of application No. PCT/CN2022/073766, filed on Jan. 25, 2022.

(30) Foreign Application Priority Data

Feb. 7, 2021    (CN) .......................... 202110178014.2

(51) Int. Cl.
*G06T 17/20*    (2006.01)
*G06T 19/00*    (2011.01)

(52) U.S. Cl.
CPC .............. *G06T 17/20* (2013.01); *G06T 19/00* (2013.01)

(58) Field of Classification Search
CPC ................................ G06T 17/20; G06T 19/00
See application file for complete search history.

(56) References Cited

U.S. PATENT DOCUMENTS 10,158,917 B1 * 12/2018 Logan ................ H04N 21/4788
10,901,431 B1 *  1/2021 Ebrahimi Afrouzi .......................
                                              G05D 1/0246
(Continued)

FOREIGN PATENT DOCUMENTS

CN       109754458 A      5/2019
CN       110473293 A     11/2019
(Continued)

OTHER PUBLICATIONS

The World Intellectual Property Organization (WIPO) International Search Report for PCT/CN2022/073766 Apr. 7, 2022 6 Pages (including translation).

(Continued)

*Primary Examiner* — Xin Sheng
(74) *Attorney, Agent, or Firm* — ANOVA LAW GROUP, PLLC

(57) ABSTRACT

A virtual scenario generation method includes acquiring scenario characteristic information corresponding to a target virtual scenario to be generated; generating a scenario division mesh in an initial virtual scenario based on the scenario characteristic information, the scenario division mesh comprising division marking data configured to divide the initial virtual scenario; generating a scenario object collection which is about to be added to the scenario division mesh and comprises one or more scenario objects; performing attribute matching on the one or more scenario objects and the division marking data to obtain one or more candidate scenario objects allocated to the division marking data; selecting a target scenario object from the one or more candidate scenario objects according to position associated information between the candidate scenario objects and the division marking data; and matching the target scenario (Continued)

object with the division marking data to generate the target virtual scenario.

20 Claims, 19 Drawing Sheets

(56) References Cited

U.S. PATENT DOCUMENTS

| | | | | |
|---|---|---|---|---|
| 2018/0350147 | A1* | 12/2018 | Lodato | H04N 13/282 |
| 2020/0312042 | A1* | 10/2020 | Sardari | G06T 7/50 |
| 2022/0148279 | A1 | 5/2022 | Kang | |

FOREIGN PATENT DOCUMENTS

| | | |
|---|---|---|
| CN | 111921203 A | 11/2020 |
| CN | 112784002 A | 5/2021 |

OTHER PUBLICATIONS

Yoav I H Parish et al. "Procedural Modeling of Cities", Central Pictures, Switzerland.
Arnaud Emilien et al. "Procedural Generation of Villages on Arbitrary Terrains", 2012, The Visual Computer, Springer Verlag.
Peter Wonka et al . "Modeling 3D Urban Spaces Using Procedural and Simulation-Based Techniques", Siggraph 2011, Part 1.
Martin Evans, "Procedural Generation For Dummies In Which It Is Revealed Locked Doors Aren't So Bad", Dec. 11, 2015, https://martindevans.me/game-development/2015/12/11/Procedural-Generation-For-Dummies/.
"Medieval Fantasy City Generator by watabou", https://watabou.itch.io/medieval-fantasy-city-generator.
"Generate street networks", City Engine 2022.01,https://doc.arcgis.com/en/cityengine/latest/help/help-grow-a-street.htm.
"Tutorial 2: Terrain and dynamic city layouts", City Engine 2019.0, https://doc.arcgis.com/en/cityengine/2019.0/tutorials/tutorial-2-terrain-and-dynamic-city-layouts.htm.
Yidong Ma, "Procedural Street Modelling In Houdini 1 | Procedural Street Generation In Houdini I", Aug. 17, 2018, http://ma-yidong.com/2018/08/17/procedural-street-modelling-in-houdini-1/.
Big Head, "Procedural modeling notes—Road Generation (1)", https://zhuanlan.zhihu.com/p/105661338.
Vincent Delassus et al., "Procedural Technology in Ghost Recon: Wildlands", https://80.lv/articles/procedural-technology-in-ghost-recon-wildlands/.
"Marvel's Spider-Man, meet Houdini | David Santiago | GDC 2019", https://www.youtube.com/watch?v=DOERCi9mMZg.
"Attraction / Night Guard Main Road | Post", https://www.sidefx.com/community/main-road-post-attraction-night-guard/.
"Building the Cities of Incredibles 2 (Pixar / Esri / VES Webinar)", https://www.youtube.com/watch?v=ot_0hrD72P4.
Gabriel Dias Fernandes et al., "Space Colonisation for Procedural Road Generation", Nov. 2018, 2018 International Conference on Graphics and Interaction (ICGI).
E. Galin et al., "Procedural Generation of Roads", Jun. 2010 , Computer Graphics Forum.
Guoning Chen et al., "Interactive Procedural Street Modeling", Aug. 2008, ACM Transactions on Graphics.
Remi Cura et al., "Streetgen: In-Base Procedural-Based Road Generation", ISPRS Annals of the Photogrammetry, Remote Sensing and Spatial Information Sciences, vol. II-3/W5, 2015 ISPRS Geospatial Week, Sep. 28, 2015-Oct. 3, 2015, La Grande Motte, France.
Carlos A. Vanegas et al., "Procedural Generation of Parcels in Urban Modeling", 2012, vol. 31 No. 2, Eurographics 2012.
Kenichi Sugihara et al., "Straight Skeleton Computation Optimized for Roof Model Generation", 2019, WSCG Proceedings part 1.
George Kelly et al., "Citygen: An Interactive System for Procedural City Generation"., Nov. 2007, The Fifth Annual International Conference in Computer Game Design and Technology., Liverpool, United Kingdom.
"Procedural City Generation", https://www.tmwhere.com/city_generation.html.
Jonathan Sauder, "Procedural City Generation in Python—Documentation", https://josauder.github.io/procedural_city_generation/.
Alan Bucior, "Developing a Procedural City", https://web.archive.org/web/20220119220005/https:/www.mpc-md.com/developing-a-procedural-city-tool-for-alien-covenant/.
Eric Galin et al., "Authoring Hierarchical Road Networks", vol. 30, No. 7, Pacific Graphics 2011.2011 The Eurographics Association and Blackwell Publishing Ltd.
Peter Wonka et al . "Modeling 3D Urban Spaces Using Procedural and Simulation-Based Techniques", Siggraph 2011, Part 2.
Peter Wonka et al . "Modeling 3D Urban Spaces Using Procedural and Simulation-Based Techniques", Siggraph 2011, Part 3.

* cited by examiner

| Building blueprint | | |
|---|---|---|
| Asset name and route | Asset name | Asset route |

Output

Output attribute set area

Building

| | Title | 2 | +   - Clear | ... 801 |
| Set | | | | |
| | Group 1 | @size.y>150 | | ... 802 |
| ☐ | | | | |
| ☑ | Category 1 | High-rise building | | |
| ☑ | Size attribute 1 | 1 | ——┼—— | |
| | Criterion quantity 1 | 2 | +   - Clear | |

Criterion 1(1)
| ☑ | Attribute | Population density | | ... 803 |
| ☑ | Minimum value | 0.5 | ————┼— | |
| ☐ | Maximum value | | | |
| ☐ | Distance | | | ... 804 |

Criterion 1(2)
| ☑ | Attribute | Expressway | |
| ☑ | Minimum value | 1 | ———————┤ |
| ☐ | Maximum value | | |
| ☐ | Distance | | |

Building

☐ Activate

| Minimum size | 0 | 0 |
| Lower inner edge distance | 0 | 0 |
| Upper inner edge distance | 0 | 0 |

VIRTUAL SCENARIO GENERATION METHOD, APPARATUS AND DEVICE AND STORAGE MEDIUM

CROSS-REFERENCES TO RELATED APPLICATIONS

This application is a continuation application of PCT Patent Application No. PCT/CN2022/073766, entitled "VIRTUAL SCENARIO GENERATION METHOD AND APPARATUS, AND DEVICE AND STORAGE MEDIUM" and filed on Jan. 25, 2022, which claims priority to Chinese Patent Application No. 202110178014.2, entitled "VIRTUAL SCENARIO GENERATION METHOD, APPARATUS AND DEVICE AND STORAGE MEDIUM" and filed with the China National Intellectual Property Administration on Feb. 7, 2021, the entire contents of both of which are incorporated herein by reference.

FIELD OF THE TECHNOLOGY

The present disclosure relates to the field of computer technologies, and specifically, to a virtual scenario generation method, an apparatus, a device, and a storage medium.

BACKGROUND OF THE DISCLOSURE

With the development of information technology, people can simulate scenarios in life on a computer device so as to generate simulated virtual scenarios and may also re-create or design new virtual scenarios. For example, a simulated or created virtual community, virtual village, virtual city, etc., can be generated; for another example, a simulated or created virtual system, virtual galaxy, and virtual universe can be generated; and so forth. The generated virtual scenarios have many purposes such as film and television special effects and game scene construction.

However, current methods for generating virtual scenarios are low in efficiency, and huge vigor and costs need to be paid via developer handwork design or generation based on real scenario information such as aerial photo images.

SUMMARY

The embodiment of the present disclosure provides a virtual scenario generation method, apparatus and device and a storage medium, which can improve virtual scenario generation efficiency.

The embodiment of the present disclosure provides the virtual scenario generation method executed by an electronic device, including: acquiring scenario characteristic information corresponding to a target virtual scenario to be generated; generating a scenario division mesh in an initial virtual scenario based on the scenario characteristic information, the scenario division mesh comprising division marking data configured to divide the initial virtual scenario; generating a scenario object collection which is about to be added to the scenario division mesh and comprises one or more scenario objects; performing attribute matching on the one or more scenario objects and the division marking data to obtain one or more candidate scenario objects allocated to the division marking data; selecting a target scenario object from the one or more candidate scenario objects according to position associated information between the candidate scenario objects and the division marking data; and matching the target scenario object with the division marking data to generate the target virtual scenario.

Correspondingly, an embodiment of the present disclosure further provides a non-transitory computer-readable storage medium storing a computer program. When the computer program is executed by the processor, steps of any one of the virtual scenario generation method provided in the embodiments of the present disclosure are performed.

Correspondingly, an embodiment of the present invention further provides an electronic device, including a memory, a processor, and a computer program stored in the memory and capable of being run on the processor, where the processor, when executing the computer program, implements steps of the virtual scenario generation method according to the embodiments of the present disclosure.

Correspondingly, an embodiment of the present disclosure further provides a computer program product or a computer program, the computer program product or the computer program including computer instructions, the computer instructions being stored in a computer-readable storage medium. A processor of a computer device reads the computer instructions from the computer-readable storage medium, and executes the computer instructions, to cause the computer device to perform the foregoing virtual scenario generation method.

BRIEF DESCRIPTION OF THE DRAWINGS

To describe the technical solutions in the embodiments of the present disclosure more clearly, the following briefly describes accompanying drawings required for describing the embodiments. Apparently, the accompanying drawings in the following description show merely some embodiments of the present disclosure, and a person skilled in the art may still derive other drawings from these accompanying drawings without creative efforts.

FIG. 8 is an interface schematic diagram of setting building attributes through Houdini according to an embodiment of the present disclosure.

DESCRIPTION OF EMBODIMENTS

The technical solutions in the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Embodiments of the present disclosure provide a virtual scenario generation method, an apparatus, a device, and a storage medium. Specifically, the embodiment of the present disclosure provides a virtual scenario generation apparatus suitable for an electronic device. Wherein, the electronic device may be a terminal or a server, or the like, and the terminal may be a mobile phone, a tablet personal computer, a notebook computer, etc. The server may be a single server, or a server cluster including a plurality of servers.

The embodiment of the present disclosure exemplarily introduces a virtual scenario generation method executed by a terminal.

Figure 1:
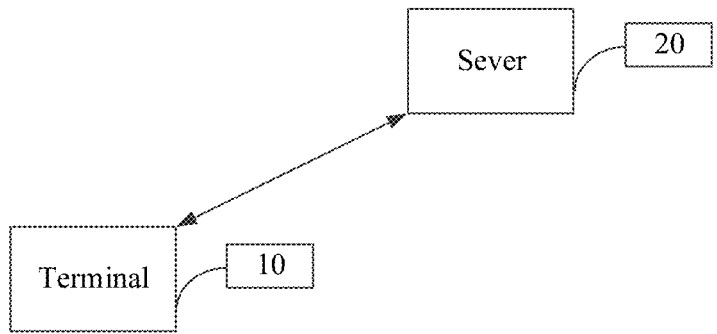
FIG. 1 is a scenario schematic diagram of a virtual scenario generation method according to an embodiment of the present disclosure.

Referring to FIG. 1, the embodiment of the present disclosure provides a virtual scenario generation system including a terminal 10, wherein, the terminal 10 may be configured to generate a target virtual scenario, for example, may be configured to generate a simulated or created virtual community, virtual village and virtual city, and may also be configured to generate a simulated or created virtual system, virtual galaxy, virtual universe, and so forth.

Specifically, the terminal 10 may acquire scenario characteristic information corresponding to the to-be-generated target virtual scenario and generates a scenario division mesh in an initial virtual scenario based on the scenario characteristic information, wherein the initial virtual scenario may serve as a container for bearing division marking data and scenario objects in a target virtual scenario generation or construction process, and thus the target virtual scenario can be generated under assistance of adding the division marking data and the scenario objects in the initial virtual scenario. In addition, the generated scenario division mesh may include at least one division marking data which may be configured to divide the initial virtual scenario.

The terminal 10 may generate a scenario object collection which is about to be added to the scenario division mesh and includes at least one scenario object. For example, when the target virtual scenario is the simulated or designed virtual city, the scenario objects may be buildings, vegetations, etc.

Furthermore, the terminal 10 may perform attribute matching on the scenario objects and the division marking data in the scenario division mesh, thereby obtaining candidate scenario objects allocated to the division marking data. Target scenario objects are selected from the candidate scenario objects allocated to the division marking data based on position associated information between the candidate scenario objects and the division marking data. Thus, the terminal 10 may add the target scenario objects to the scenario division mesh to generate the target virtual scenario through matching of the target scenario objects and the division marking data.

In another embodiment, a virtual scenario generation method may be jointly executed by a terminal and a server.

Referring to FIG. 1, a virtual scenario generation system includes the terminal 10 and the server 20, wherein the terminal 10 may send scenario characteristic information corresponding to a to-be-generated target virtual scenario to the server 20. Correspondingly, the server 20 may acquire the scenario characteristic information of the to-be-generated target virtual scenario; generate a scenario division mesh in an initial virtual scenario based on the scenario characteristic information, wherein the scenario division mesh may include at least one division marking data which may be configured to divide the initial virtual scenario; generate a scenario object collection which is about to be added to the scenario division mesh and may include at least one scenario object; perform attribute matching on the scenario objects and the division marking data in the scenario division mesh to obtain candidate scenario objects allocated to the division marking data; select target scenario objects from the candidate scenario objects according to position associated information between the candidate scenario objects and the division marking data; and match the target scenario objects with the division marking data so as to add the target scenario objects to the scenario division mesh, thereby generating the target virtual scenario.

In some embodiments, the server 20 may send scenario rendering data of the generated target virtual scenario to the terminal 10 so that the terminal 10 can show related pictures of the target virtual scenario based on the scenario rendering data.

Detailed descriptions are provided respectively in the following. A description order of the following embodiments is not construed as a limitation on a preferred order of the embodiments.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The embodiment of the present disclosure provides a virtual scenario generation method, and relates to the technologies such as computer vision based on artificial intelligence. In addition, the method is executed by an electronic device, such as a terminal 10 or a server 20 in FIG. 1, or may be jointly executed by the terminal 10 and the server 20.

Figure 2:
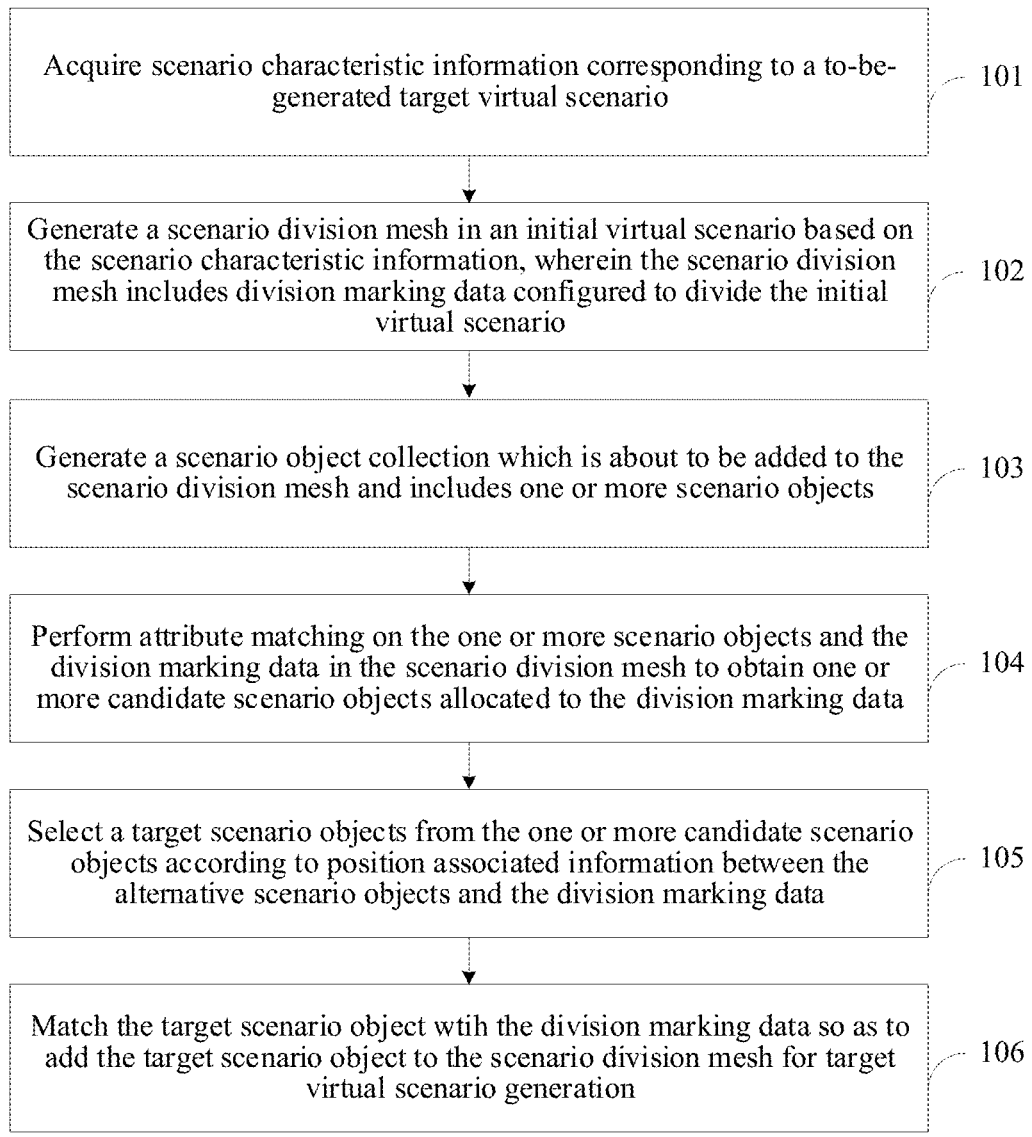
FIG. 2 is a flowchart of a virtual scenario generation method according to an embodiment of the present disclosure.

The embodiment of the present disclosure exemplarily introduces the virtual scenario generation method executed by the terminal and specifically executed by a virtual scenario generation apparatus integrated in the terminal, and as shown in FIG. 2, a specific process of the virtual scenario generation method may include the following steps:

101: Acquire scenario characteristic information of a to-be-generated target virtual scenario.

Wherein, scenarios in real life refer to certain task actions happening within a certain time and space or specific life pictures formed by character relations, and relatively speaking, is staged landscape presentation of character actions and life events for showing a specific development process of plot contents.

The to-be-generated target virtual scenario involved in the present disclosure may be a to-be-modeled virtual scenario, specifically, may be a simulated virtual scenario obtained by simulating, via a computer vision technology, scenarios in real life, and may also be a new virtual scenario obtained after re-creation or design modeling via the computer vision technology. For example, the target virtual scenario may be a simulated or created virtual community, virtual village, virtual city, etc., and may also be a simulated or created virtual system, virtual galaxy, virtual universe, etc.; and so forth. The generated target virtual scenario may have many purposes such as film and television special effects, game scene construction, etc.

In the embodiment of the present disclosure, the virtual scenario generation method may be introduced by taking the target virtual scenario being the virtual city as an example, wherein, the to-be-generated target virtual scenario may be the simulated virtual city, or the created virtual city, or a virtual city generated through assistance of real data in reality, etc.

Wherein, the scenario characteristic information is used for describing characteristics of the target virtual scenario and may be related information for describing multi-dimension scenario characteristics of the target virtual scenario, such as a geographical dimension, a population density dimension, a functional area dimension and a building height dimension.

For example, characteristics of the scenario characteristic information in geographical dimension include altitude distribution, land distribution, water resource distribution, vegetation distribution, etc.; for another example, the scenario characteristic information may describe characteristics of the target virtual scenario in social statistics significance, including population density distribution, functional area distribution (taking the target virtual scenario being the virtual city as an example, functional areas may include a residential district, a commercial district, a mixed district, etc.), height distribution (taking the target virtual scenario being the virtual city as an example, height distribution may be height distribution of buildings in city), etc.

There are many data formats of the scenario characteristic information, such as a data table, an image, an audio and other various data formats.

In an embodiment, when scenario characteristic information is population density distribution information of a virtual city, acquiring scenario characteristic information corresponding to a to-be-generated target virtual scenario may be achieved by acquiring a population density distribution diagram of the virtual city.

In practical application, there may be many ways for acquiring the scenario characteristic information corresponding to the to-be-generated target virtual scenario, such as extracting from a database, requesting for a server or a network, real-time collecting or searching through a data acquisition device such as a camera or a vidicon, or user input, or the like.

102: Generate a scenario division mesh in an initial virtual scenario based on the scenario characteristic information, wherein the scenario division mesh may include division marking data which may be configured to divide the initial virtual scenario.

Wherein, the initial virtual scenario may serve as a basic container adopted in a process of generating or constructing the target virtual scenario. For example, the initial virtual scenario may serve as a container for to-be-generated division marking data and scenario objects, and thus the target virtual scenario can be generated under assistance of adding the division marking data and the scenario objects to the initial virtual scenario.

For example, the initial virtual scenario may be a coordinate system, such as a three-dimension coordinate system or a two-dimension coordinate system, or the like, and the coordinate system may be a blank coordinate system and may also be non-blank coordinate system with existing scenario objects. In an embodiment, target virtual scenario construction may be performed in graphic software, and thus the initial virtual scenario may be in a graphic software initialization state when the graphic software generates the target virtual scenario. For example, the target virtual scenario may be constructed in three-dimension computer graphic software Houdini, the initial virtual scenario may be a three-dimension coordinate system in a Houdini interactive interface, moreover, the three-dimension coordinate system may be blank, and namely, the target virtual scenario is constructed in Houdini from blank. The three-dimension coordinate system may be the non-blank three-dimension coordinate system, and namely, the target virtual scenario is continuously constructed by Houdini in an existing virtual scenario.

Herein, the division marking data include information about how to divide the initial virtual scenario, and may include visible division line(s) and/or invisible marking data. For example, the visible division line may be a line segment, a straight line, a dotted line, a curve, etc., and under the situation, the division marking data may serve as a part of the final generated target virtual scenario to be presented;

and for another example, the invisible marking data may include coordinate data, length data, etc., and the invisible division marking data may include data needed for assisted generation of the target virtual scenario instead of a part of the final generated target virtual scenario to be presented.

In an embodiment, when a target virtual scenario is a virtual city, a visible division line may be a road in the virtual city, the virtual city may be divided into different areas through the road, and in the embodiment, division marking data may serve as a part of the final generated virtual city to be presented.

In another embodiment, when a target virtual scenario is a virtual universe, invisible marking data may be needed to divide the virtual universe into different parts, such as different galaxies, or different space regions, or the like. In the embodiment, division marking data may only serve as marking data needed for assisted generation of the virtual universe instead of a part of the virtual universe to present the virtual universe.

Wherein, a scenario division mesh is formed by the division marking data. In some embodiments, the scenario division mesh may include nodes formed by intersection or crossing of the division marking data, or independent nodes, which is not limited by the embodiment of the present disclosure.

The scenario characteristic information includes the related information of the scenario characteristics for describing the target virtual scenario, and thus, the scenario division mesh may be generated in the initial virtual scenario based on the scenario characteristic information. For example, a basic division mesh can be generated in the initial virtual scenario, and then, division lines in the basic division mesh are further adjusted so as to generate the scenario division mesh. Specifically, the step of generating the scenario division mesh in the initial virtual scenario based on the scenario characteristic information may include the following steps:

Generate the basic division mesh in the initial virtual scenario based on the scenario characteristic information, wherein the basic division mesh may include at least one to-be-adjusted division line.

Adjust the to-be-adjusted division lines based on line intersection information of the to-be-adjusted division lines in the basic division mesh to obtain adjusted division lines.

Determine the scenario division mesh according to the adjusted division lines.

Wherein, the basic division mesh is a basic mesh needed for generating the scenario division mesh, specifically, the basic division mesh may be formed by the at least one to-be-adjusted division line, and accordingly, the scenario division mesh can be obtained by adjusting the to-be-adjusted division lines.

For example, if the target virtual scenario is the virtual city, the basic division mesh may be correspondingly a basic road network of the virtual city in a city road network generating process. Furthermore, a line distribution pattern may be utilized for guiding generation of the basic road network of the virtual city, thereby enabling the generated basic road network to conform to the road distribution pattern.

Thus, the basic road network can be firstly generated, is closer to a final city road network in large scale, but still needs to be later adjusted. For example, the basic road network is similar to the final city road network in road distribution, but details in various road segments still need to be adjusted.

Wherein, adjustments on the division lines may refer to division line acceptance, refusal and modification under local limiting conditions within a certain range. The adjustments aim to correct small-scale errors so as to improve local consistency of the basic division mesh, thereby obtaining the final scenario division mesh.

Based on the scenario characteristic information, there may be many ways for generating the basic division mesh in the initial virtual scenario, such as combination with the line distribution pattern and a tensor field, and specifically, the step of generating the basic division mesh in the initial virtual scenario based on the scenario characteristic information may include the following steps:

Determine a line distribution pattern needed for generating the basic division mesh.

Convert the scenario characteristic information to obtain tensor information corresponding to the scenario characteristic information.

Generate the basic division mesh in the initial virtual scenario based on the line distribution pattern and the tensor information.

Wherein, the line distribution pattern may be a pattern to which describing distribution of the division lines in the target virtual scenario conforms, for example, when the target virtual scenario is the virtual city, the line distribution pattern may be a pattern to which describing distribution of roads in the virtual city conforms, such as a natural pattern, a mesh pattern, a radiation pattern and an altitude guide pattern.

For example, in the natural pattern, road distribution may be consistent to population density distribution of the virtual city, and namely, distribution of the city road network is consistent to natural increase of population density, for example, the natural pattern is common in old blocks in city.

In the mesh pattern, road distribution may conform to a given overall angle or local angle and maximum length and maximum width of a single area block, for example, when road distribution conforms to the mesh pattern, a large number of rectangular blocks may be generated in the virtual city.

In the radiation pattern, a road may be generated in a center radial direction, so that a generated road network is similar to a radiation shape, for example, the radiation pattern commonly exists in a city center, wherein the road is generated in the radial direction of the city center.

In the altitude guide pattern, altitudes of various regions in the virtual city guide road generation, for example, the altitude guide pattern is common in regions with large ground elevation differences; and so forth.

It's worth noting that there may be many line distribution patterns for generating the basic division mesh, weight assignment may be performed on the line distribution patterns at different positions in the initial virtual scenario during application, and accordingly, the multiple line distribution patterns are considered to different degrees based on different weights so that the multiple line distribution patterns may be mixed in the initial virtual scenario to generate the basic division mesh, thereby enabling the final generated scenario division mesh to be closer to real city characteristics.

There may be many ways for determining the line distribution patterns, such as assigning and determining by users, or system configurations. In an embodiment, when an engineer applies a virtual scenario generation method in the present disclosure to generate a virtual city, the engineer may select a needed line distribution pattern by analyzing service requirements. In the embodiment, scenario characteristic information of a target virtual scenario may be converted to obtain tensor information corresponding to the scenario characteristic information. Wherein, there may be multiple tensor information representation forms such as a tensor field form, specifically, the tensor field is generalization of a scalar field or a vector field, and a scalar or a vector may be allocated to each spatial point in the tensor field.

For example, the target virtual scenario is the virtual city, the scenario characteristic information may be population density distribution data of the virtual city, and then, the population density distribution data may be converted to obtain the corresponding tensor field.

There may be multiple tensor data structures, for example, a scalar is a 0-order tensor, a vector is a first-order tensor, a two-dimensional matrix is a second-order tensor, and a three-dimensional matrix is a third-order tensor. Thus, there may be many ways for converting the scenario characteristic information to obtain the tensor information.

For example, the tensor data structure may be the two-dimensional matrix, and then, data in the scenario characteristic information may be converted into a corresponding two-dimensional matrix to obtain tensor information corresponding to the scenario characteristic information. For example, the scenario characteristic information may be the population density distribution data of the virtual city, and data in the scenario characteristic information may be converted into a corresponding two-dimensional matrix to obtain a tensor field corresponding to the population density distribution data.

In the embodiment, after the line distribution pattern needed for generating the basic division mesh and the tensor information corresponding to the scenario characteristic information of the target virtual scenario are determined, the basic division mesh may be further generated based on the line distribution pattern and the tensor information, and specifically, the step of generating the basic division mesh in the initial virtual scenario based on the line distribution pattern and the tensor information may include the following steps:

Generate a basic division mesh complying with a line distribution pattern in the initial virtual scenario, wherein the basic division mesh includes at least one to-be-corrected division line.

Perform geometric correction on the to-be-corrected division lines according to the tensor information to obtain corrected division lines as to-be-adjusted division lines in the basic division mesh.

Wherein, there may be many ways for generating the basic division mesh complying with the line distribution pattern, for example, a basic division mesh generation module accepting the line distribution pattern as a parameter may be designed, and the generation module generates the basic division mesh complying with the line distribution pattern As an example, following pseudo codes may be utilized for reference in understanding the step of generating the basic division mesh complying with the line distribution pattern in the initial virtual scenario:

add new road according to pattern;

wherein, a "pattern" parameter shows the line distribution pattern, and "new road" shows one to-be-corrected division line in the basic division mesh.

In addition, the generation module may also accept other auxiliary parameters besides accepting the line distribution pattern as the parameter, and generate the basic division mesh in combination with the line distribution pattern, for example, the auxiliary parameters may include branch probability, etc.

In an embodiment, a generation module may be designed on the basis of an idea of an L System. Specifically, the Lindenmayer System (L system) is a character string rewriting mechanism widely applied to studying and modeling in a plant growth process. In the embodiment, the basic division mesh generation module may be designed on the basis of the idea of the L System, the line distribution pattern needed for generating the basic division mesh is accepted as the parameter, and accordingly, the basic division mesh complying with the line distribution pattern is generated in the initial virtual scenario.

In the embodiment, the generation module generates division lines within a wide range based on the accepted parameters, for example, roads are generated from everywhere to the city center according to population density distribution data and branch probability, and then, the generated roads are adjusted.

It's worth noting that the basic division mesh generated only on the basis of the line distribution pattern does not consider scenario characteristic information of a target virtual scenario, thus, the division lines in the basic division mesh are possibly inconsistent to scenario characteristics of the target virtual scenario, and in other words, the generated basic division mesh includes at least one to-be-corrected division marking data.

For example, the target virtual scenario may be the virtual city, the line distribution pattern needed for generating the basic division mesh may be the mesh pattern, and in addition, the scenario characteristic information for describing the target virtual scenario may be the population density distribution data. Then, after the basic division mesh complying with the mesh pattern is generated in the initial virtual scenario, the basic division mesh may include a plurality of rectangular blocks, and distribution of the division lines is possibly inconsistent to population density distribution of the virtual city at the time. Wherein, there may be multiple inconsistent situations, for example, averagely-distributed division lines instead of more division lines are generated in an area with high population density; for another example, an angle of the generated division lines is inconsistent to a density change direction in population density distribution; and so forth.

Thus, the division lines in the basic division mesh generated only on the basis of the line distribution pattern need to be further corrected, such as geometric correction.

Wherein, the division lines are subjected to geometric correction from a geometric dimension, for example, geometric characteristics of the division lines are adjusted, such as division line angle, length, position, width, etc.

In the embodiment, geometric correction on the division lines in the basic division mesh based on the scenario characteristic information may be achieved by tensor information corresponding to the scenario characteristic information. For example, the target virtual scenario may be the virtual city, the scenario characteristic information may be the population density distribution data, and then, the angle of the division lines in the basic division mesh may be adjusted according to the tensor information corresponding to the population density distribution data so as to achieve geometric correction on the division lines, thereby obtaining the division lines conforming to the line distribution pattern and city population density distribution.

As an example, following pseudo codes may be utilized for reference in understanding the step of performing geometric correction on the to-be-corrected division lines according to the tensor information to obtain the corrected division lines:

rotate road direction with angle deviation;
if rotated road population>=straight line population
use rotated road;
if new road population<threshold
rotate road according to population gradient field;
wherein, "road" shows a to-be-corrected division line, a core idea is "rotate road direction with angle deviation", and namely, "road direction" of the division line is adjusted by comparing "angle deviation" between the division line and the tensor information corresponding to the population density distribution data (population).

In addition, after geometric correction is performed, according to the tensor information, on the division lines in the basic division mesh complying with the line distribution pattern, the corrected division lines may be further adjusted in combination with other auxiliary parameters, for example, the auxiliary parameters may include a preset population threshold, etc., and adjustment may include newly increasing or deleting division lines, etc. As an example, following pseudo codes may be utilized for reference in understanding:

if new road population>branch threshold
add a branch road;
if new road population>threshold
add a road;

Wherein, "new road" is the division line obtained after geometric correction, "new road population" shows population density corresponding to the division line, "branch threshold" and "threshold" both refer to a preset population threshold, and thus whether a distributor road or a main road needs to be newly increased or not may be determined by comparing "new road population" with "branch threshold" and comparing "new road population" with "threshold".

Furthermore, a final basic division mesh in the initial virtual scenario can be correspondingly generated after the corrected division lines are obtained via geometric correction on the division lines in the basic division mesh.

In the embodiment, after the basic division mesh is generated in the initial virtual scenario, the division lines in the basic division mesh can be further adjusted so as to generate the final scenario division mesh later. For example, the division lines may be adjusted on the basis of line intersection information of the division lines in the basic division mesh to obtain the adjusted division lines.

Wherein, the line intersection information may be related information for describing an intersection situation between the division lines in the basic division mesh. For example, the line intersection information of the division lines may be whether the division line intersects with the other division lines or not, or whether the division line is close to an intersection of the lines within a certain range or not, or whether the division line is close to but not intersect with the other division lines within a certain range or not, or the like.

In the embodiment, there may be many ways for local adjustment on the division lines based on the line intersection information of the division lines in the basic division mesh, for example, corresponding line constraint rules may be designed for different line intersection situations, and local adjustment is performed on the division lines by conforming to the line constraint rules based on the line intersection information of the division lines. Specifically, the step of adjusting to-be-adjusted division lines based on line intersection information of to-be-adjusted division lines in a basic division mesh to obtain adjusted division lines may include the following steps:

Design line constraint rules based on the line intersection information and determine to-be-adjusted target division lines.

Adjust the target division lines in conforming to the line constraint rules and obtain the adjusted division lines.

Wherein, the line constraint rules may be related rules for constraining the division line, the line constraint rules may be related rules for constraining geometric characteristics of the division line, e.g., angle, length and position, or may be constraint rules for generating line joints based on intersection situations between the division line and the other division lines, or the like.

After the target division lines are determined, the target division lines may be adjusted by conforming to the line constraint rules to obtain the adjusted division lines.

In an embodiment, line constraint rules may be constraint rules for generating line joints based on intersection situations between one division line and the other division lines. For example, when the target virtual scenario is the virtual city, the division line is a road in the virtual city, and the generated line joints may be corresponding road intersections in the virtual city.

Figure 3:
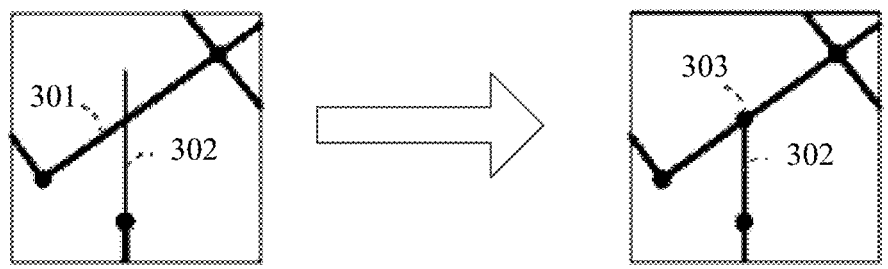
FIG. 3 is an application schematic diagram of a line constraint rule according to an embodiment of the present disclosure.

For example, the line constraint rules may constrain that one line joint is generated if intersecting of two division lines is detected. As an example, referring to FIG. 3, it can be seen that intersecting of a road 301 and a road 302 is detected in a left figure, then, the road 302 can be adjusted, as shown in a right figure, a line joint 303 is generated, and the road 302 is shortened till the line joint 303.

Figure 4:
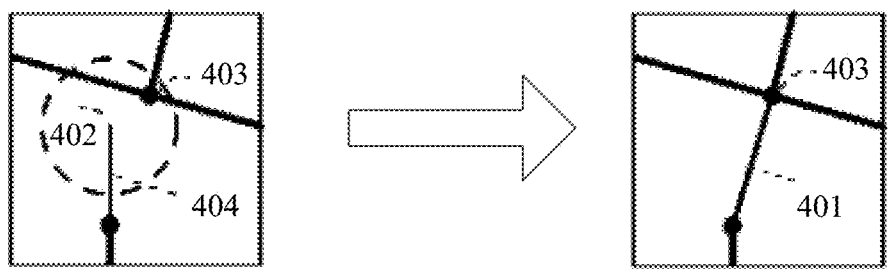
FIG. 4 is another application schematic diagram of a line constraint rule according to an embodiment of the present disclosure.

For example, the line constraint rules may constrain that if it is detected that an end point of a division line is close to an existing line joint within a certain range, the division line is lengthened to reach the line joint. Specifically, referring to FIG. 4, it can be seen that an end point 402 of a road 401 is detected in a left figure and is close to an existing line joint 403 within a range shown by a dotted-line circle, then, the road 401 can be adjusted, and as shown in a right figure, the road 401 is lengthened so that the road 401 reaches the line joint 403.

Figure 5:
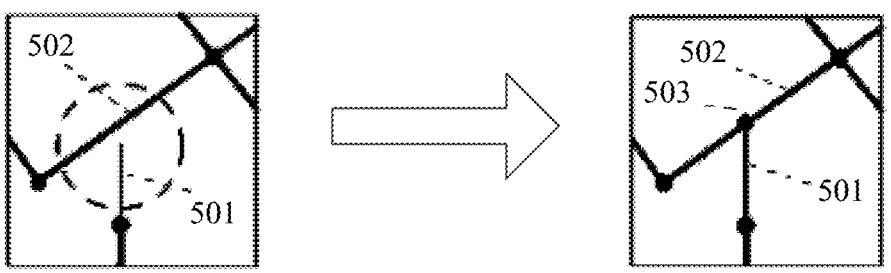
FIG. 5 is another application schematic diagram of a line constraint rule according to an embodiment of the present disclosure.

For another example, the line constraint rules may constrain that if it is detected that a division line is close to other division lines within a certain range, the division line is lengthened till the other division lines so as to generate a line joint. Specifically, referring to FIG. 5, it can be seen that it is detected that a road 501 is close to other roads 502 within a range shown in a dotted-line circle in a left figure, local adjustment can be performed on the road 501, and as shown in a right figure, the road 501 is lengthened so that the road 501 intersects with the road 502 so as to generate a line joint 503.

It's worth noting that the line constraint rules may be set based on service requirements, and the above line constraint rules are only exemplary rather than all rules.

In the embodiment, the adjusted division lines can be obtained after adjusting the division lines in the basic division mesh, and thus, the scenario division mesh formed by the adjusted division lines is determined.

103: Generate a scenario object collection which is about to be added to the scenario division mesh and may include at least one scenario object.

Wherein, scenario objects may be content objects in the target virtual scenario, for example, when the target virtual scenario is the virtual city, the content objects include buildings, characters, animal characters, vegetations, water resources, etc.; and when the target virtual scenario is the virtual universe, the content objects include celestial bodies, probes, satellites, etc.

Wherein, the scenario object collection may include the scenario objects in the target virtual scenario. For example, the scenario object collection may include all scenario objects in the target virtual scenario; and for another example, the scenario object collection may be a collection including a certain object category of scenario objects in the target virtual scenario, such as a building collection.

There may be many ways for generating the scenario object collection, for example, the scenario objects may be generated by assembling submodules of to-be-generated scenario objects. Specifically, the step of generating the scenario object collection which is about to be added to the scenario division mesh may include the following steps:

Acquire submodules of to-be-generated scenario objects.

Determine a combination rule corresponding to the submodules.

Perform module combination on the submodules to obtain a combined scenario object based on module parameters of the submodules and the combination rule.

Generate the scenario object collection according to the combined scenario object.

Wherein, the submodules of the to-be-generated scenario object may be a part of the to-be-formed scenario object. For example, when the scenario object is a building, the building may be disassembled into different submodules such as walls, windows, wall corners and a gate according to size information of various parts forming the building.

Wherein, the combination rule may be a rule to which describing combination of the submodules conforms. For example, when the scenario object is the building, the combination rule of the submodules may regulate that the submodules are combined from interior to exterior on the basis of a building body so as to obtain the combined building; and so forth. During practical application, the combination rule may be set based on service requirements.

Wherein, the module parameters may be related parameters of the submodules, and outlines, combination positions and other information of the submodules can be described through the module parameters. For example, the module parameters may include size parameters, position parameters, color parameters, etc., of the submodules.

Figure 6:
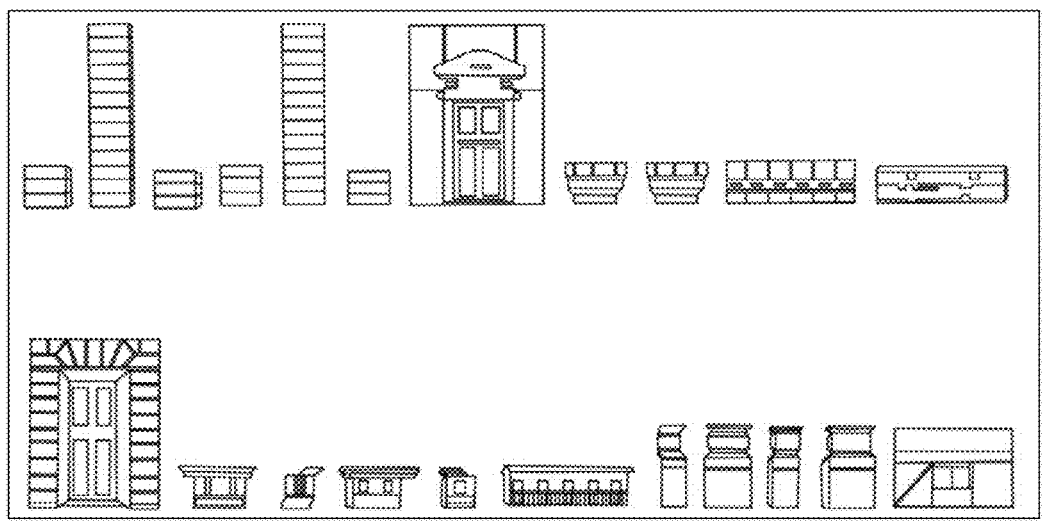
FIG. 6 is a schematic diagram of building submodules according to an embodiment of the present disclosure.
Figure 7:
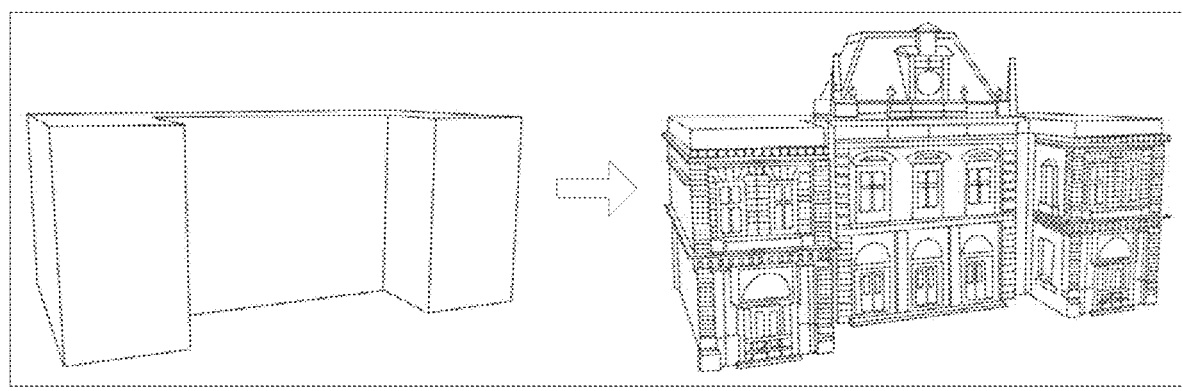
FIG. 7 is a schematic diagram of a combined building according to an embodiment of the present disclosure.

In an embodiment, a scenario object may be a building, and referring to FIG. 6, various building submodules of a to-be-generated building shown in FIG. 6 can be acquired. Furthermore, module combination is performed on the submodules to obtain the combined building shown in a right figure in FIG. 7 by combining with the combination rule of the building submodules according to module parameters of the submodules, such as position parameters and size parameters on the basis of a building body shown in a left figure in FIG. 7.

Similarly, other scenario objects in the target virtual scenario may be generated, and then, the scenario object collection which is about to be added to the scenario division mesh is obtained.

104: Perform attribute matching on the scenario objects and the division marking data to obtain candidate scenario objects allocated to the division marking data.

Wherein, attribute matching refers to matching object attributes of the scenario objects with line attributes of the division marking data so as to determine whether the scenario objects are suitable for being allocated into areas corresponding to the division marking data or not.

For example, the target virtual scenario may be the virtual city, the scenario objects may be the buildings, the division marking data may be roads in the city, and each road has corresponding attributes such as population density properly borne by the road, a road width, and a business district or a residence district being the road; each building has its corresponding attributes, such as a maximum population density properly borne by the building, a minimum population density borne by the building, a building category of the building, an architectural style of the building and a building density applicable to a building group; and so forth.

Then, alternative buildings allocated to a road A are determined from the building collection which is about to be added to the city road network by performing attribute matching on the buildings and the road A in the city road network.

Wherein, allocating the candidate scenario objects to the division marking data refers to establishing an associated relation between the candidate scenario objects and the division marking data in spatial position. For example, when the virtual scenario generation method described by the present disclosure is applied to virtual city generation, the target virtual scenario is the virtual city, the candidate scenario objects may be the alternative buildings, and the division marking data may be roads in the virtual city. Then, allocating an alternative building A to a road B refers to establishing an associated relation between the building A and the road B in spatial position, for example, it may be regulated that the alternative building A needs to be placed adjacent to the road B; it may be regulated that the alternative building A needs to be placed in a block corresponding to the road B; and it may be regulated that the alternative building A is not allowed to be placed on the road B, or otherwise, the road B will be jammed, and so forth.

Specifically, the step of performing attribute matching on the scenario objects and the division marking data to obtain the candidate scenario objects allocated to the division marking data may include the following steps:

Determine object attributes of the scenario objects and line attributes of the division marking data.

Perform attribute matching on the object attributes and the line attributes.

Determine the scenario objects passing matching as the candidate scenario objects allocated to the division marking data.

Wherein, the object attributes are related attributes of the scenario objects, for example, when the scenario objects are the buildings, the object attributes may include a maximum population density properly borne by the buildings, a minimum population density borne by the buildings, a building category of the buildings, an architectural style of the buildings and a building density applicable to a building group; and so forth.

For example, city modeling may be performed, in combination with the virtual scenario generation method described by the present disclosure, in Houdini to generate the virtual city. Refer to FIG. 8, a user may set, by Houdini, object attributes of a building, specifically, as shown in 801 in FIG. 8, the user sets a height of the building to be greater than 150 m, makes the building belong to a high-rise building shown in 802, sets a minimum population density needing to be borne by the building to be 0.5 shown in 803, and sets the building to be adjacent to an expressway shown in 804.

Wherein, the line attributes are related attributes of the division marking data, for example, when the division marking data is a road in the virtual city, the line attributes may include a population density properly borne by the road, a road width, a business district or residence district being the road, etc.

In an embodiment, a user may define object attributes of scenario objects and line attributes of division marking data. Then, after the user defines the object attributes and the line attributes, a terminal may correspondingly determine the object attributes of the scenario objects and the line attributes of the division marking data and perform attribute matching on the object attributes and the line attributes so as to determine whether the scenario objects are candidate scenario objects allocated to the division marking data or not.

There may be many ways for attribute matching, for example, the line attributes of the division marking data may be analyzed so as to determine limitations or requirements set for the scenario objects allocated to the division marking data. Furthermore, whether the scenario objects conform to the limitations or requirements set for the division marking data or not is determined by analyzing object attribute values of the scenario objects, and then whether the scenario objects are the candidate scenario objects allocated to the division marking data or not is determined.

Figure 9:
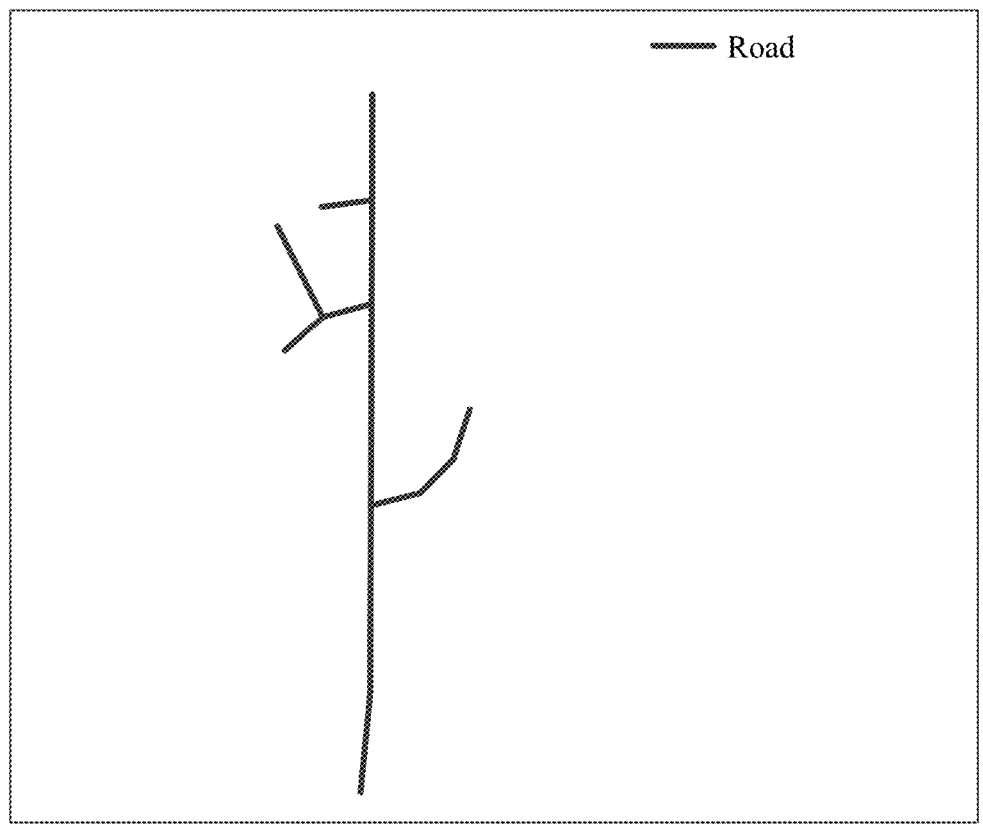
FIG. 9 is a schematic diagram of a city road network according to an embodiment of the present disclosure.

In an embodiment, when a target virtual scenario is a virtual city, scenario objects may be buildings, and a scenario division mesh may be a city road network. In an example, the previous step may be utilized for reference in generating the city road network shown in FIG. 9 in an initial virtual scenario, wherein the city road network includes at least one road.

Figure 10:
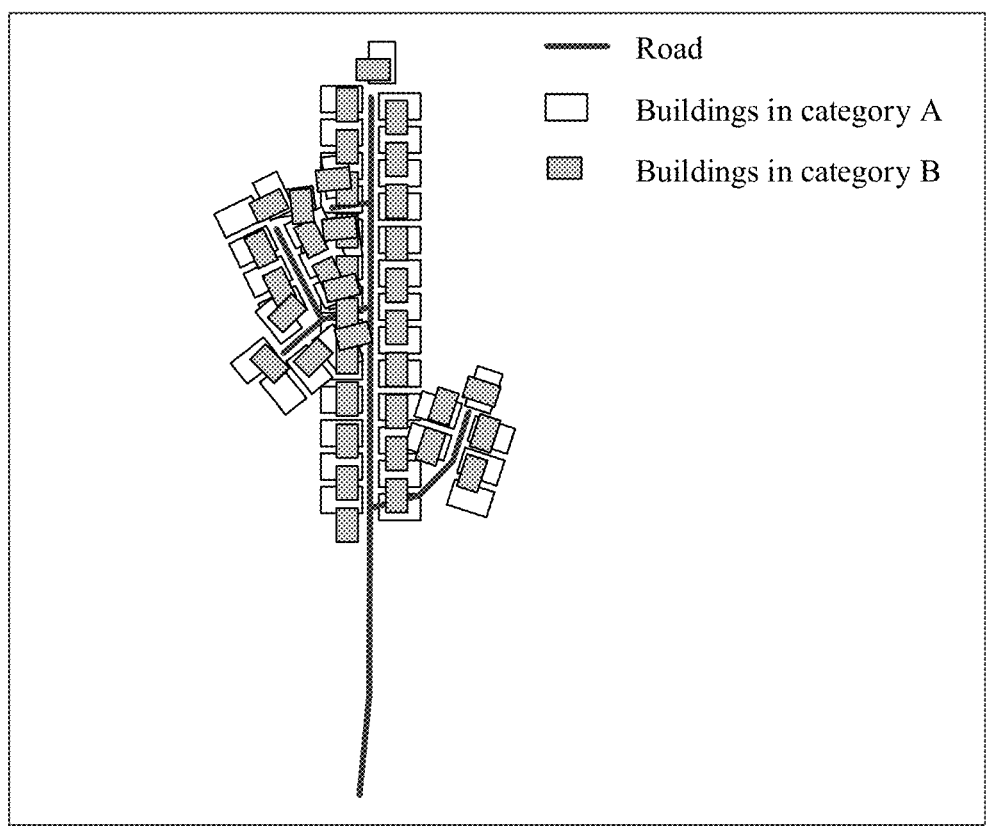
FIG. 10 is a schematic diagram of an attribute-matched road network according to an embodiment of the present disclosure.

Moreover, after a building collection which is about to be added to the city road network, object attributes of the buildings and line attributes of the roads in the city road network may be matched so as to determine alternative buildings allocated to the roads. Refer to FIG. 10 visibly showing an attribute matching result, it can be seen from FIG. 10 that a plurality of buildings conforming to attribute matching of roads are placed on the roads, wherein white rectangles and gray rectangles show different categories of buildings, for example, the white rectangles may show residential buildings, and the gray rectangles may show medical buildings.

It's worth noting that the scenario objects passing matching are not final target scenario objects, for example, the buildings shown in FIG. 10 are not target buildings finally allocated to the roads due to a serious collision phenomenon or overlap phenomenon, such as a collision phenomenon between the buildings and between the buildings and the roads. Thus, the target buildings still need to be further screened out.

In other words, attribute matching can only determine the candidate scenario objects allocated to the division marking data, and furthermore, the target scenario objects are selected from the candidate scenario objects by executing Step 105 and subsequent steps.

105: Select a target scenario object from the candidate scenario objects according to position associated information between the candidate scenario objects and the division marking data.

Wherein, the position associated information describes how the candidate scenario objects and the division marking data are associated in position. It's worth noting that positions may be in spaces with different dimensions, such as positions in a two-dimension plane, in a three-dimension space, in a higher-dimension space, etc.

Furthermore, there may be many situations of association between the candidate scenario objects and the division marking data in position, such as overlapping of the candidate scenario objects and the division marking data in position, keeping of a distance within a certain range for the candidate scenario objects and the division marking data in position, spacing of a distance at a certain threshold or above between the candidate scenario objects and the division marking data in position, etc.

The scenario objects and the division marking data in the scenario division mesh need to be matched so as to generate a complete scenario in a process of generating or constructing the target virtual scenario, and thus, the target scenario objects allocated to the division marking data need to be further determined on the basis of determining the candidate scenario objects, for example, the target scenario objects may be selected from the candidate scenario objects according to the position associated information. Specifically, the step of selecting the target scenario objects from the candidate scenario objects according to the position associated information between the candidate scenario objects and the division lines may include the following steps:

Determine position associated information between the candidate scenario objects and the division lines based on geometric characteristics of the candidate scenario objects.

Perform collision detection on the candidate scenario objects and the division lines according to the position associated information.

Select the target scenario objects allocated to the division lines from the candidate scenario objects passing collision detection.

Wherein, the geometric characteristics of the candidate scenario objects are obtained by describing the candidate scenario objects from the geometric dimension, for example, the geometric characteristics may include positions, occupied areas or spaces or other characteristics of the candidate scenario objects in the scenario.

Since the position associated information describes how the candidate scenario objects and the division marking data are associated in position, the position associated information between the candidate scenario objects and the division marking data may be determined on the basis of the geometric characteristics of the candidate scenario objects. For example, whether the candidate scenario objects and the division marking data are overlapped in position or not is determined; for another example, whether a distance within a certain range is kept between the candidate scenario objects and the division marking data in position or not is determined; for another example, whether a distance at a certain threshold or above is spaced between the candidate scenario objects and the division marking data in position or not is determined; and so forth.

Wherein, collision detection is used for determining whether two objects (or two colliders) are overlapped or not. Collision detection may include collision detection between static colliders, collision detection between dynamic colliders, and collision detection between the static colliders and the dynamic colliders. Specifically, if the colliders are not overlapped, it may be thought that detection is passed, and if not, it may be thought that detection is not passed.

There may be many ways for achieving collision detection, such as detecting, by generating rectangles or circles to wrap the colliders, whether the rectangles or circles are overlapped or not, detecting, by iteratively generating a plurality of rectangles or circles and making combined shapes of the plurality of rectangles or circles wrap the colliders, whether the combined shapes corresponding to the different colliders are overlapped or not, etc.

In an embodiment, when a target virtual scenario is a to-be-generated virtual city, candidate scenario objects may be alternative buildings, and division marking data may be a road in the virtual city. Specifically, position associated information between the alternative buildings and the road may be determined on the basis of geometric characteristics of the alternative buildings, and collision detection is performed on the alternative buildings and the road according to the position associated information so as to determine whether the alternative buildings are placed on the road and cause road jamming or not.

Figure 11:
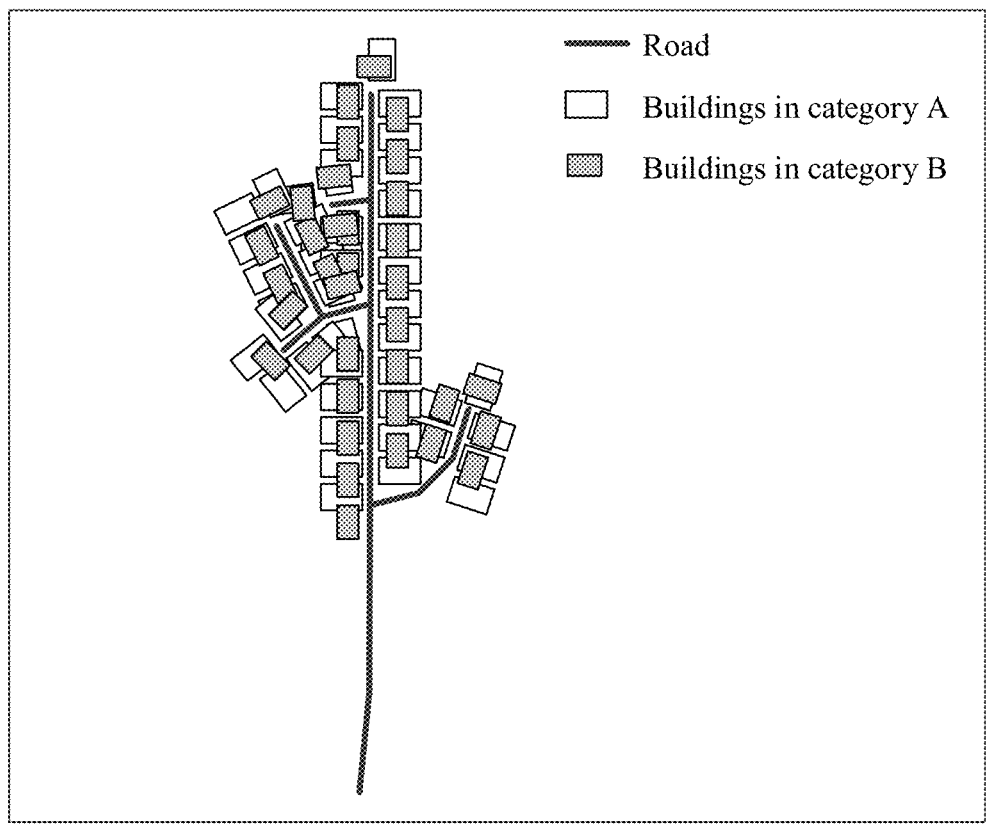
FIG. 11 is a schematic diagram of a road network eliminating alternative buildings not passing detection according to an embodiment of the present disclosure.

If detection is passed, it is shown that the alternative buildings are not placed on the road; and if detection is not passed, it is shown that the alternative buildings are placed on the road and cause road jamming. Thus, the target buildings allocated to the road may be further selected from the alternative buildings passing collision detection. Refer to FIG. 11, and FIG. 11 shows, on the basis of FIG. 10, a result obtained after eliminating the alternative buildings not passing detection after collision detection on the alternative buildings and the roads in the city road network in FIG. 10.

In the embodiment, the target scenario objects allocated to the division marking data may be further selected from the candidate scenario objects passing collision detection, and specifically, the step of selecting the target scenario objects allocated to the division marking data from the candidate scenario objects passing collision detection may include the following steps:

Determine object categories of the candidate scenario objects passing detection, wherein the object categories have corresponding object density constraint parameters.

Screen the candidate scenario objects in the object categories according to the object density constraint parameters to obtain the target scenario objects remaining after screening to be allocated to division lines.

Wherein, the object density constraint parameters describe constraint requirements of the scenario objects in the specific object categories for density. For example, if the scenario objects are the buildings in the virtual city, the object categories may be categories of the buildings, and the categories of the buildings may include residential buildings, schools, prisons, office buildings, etc. The buildings of different categories have different building density constraint rules, for example, a density constraint of the residential buildings may be 0.7, which shows that the maximum density of the residential buildings is 0.7; and so forth.

The scenario division mesh may include the candidate scenario objects in multiple object categories, the candidate scenario objects in the different object categories have different object density constraint parameters, and thus, after the object categories of the candidate scenario objects passing detection are determined, the candidate scenario objects in the object categories can be screened on the basis of the object density constraint parameters so as to avoid a situation of too dense objects.

Figure 12:
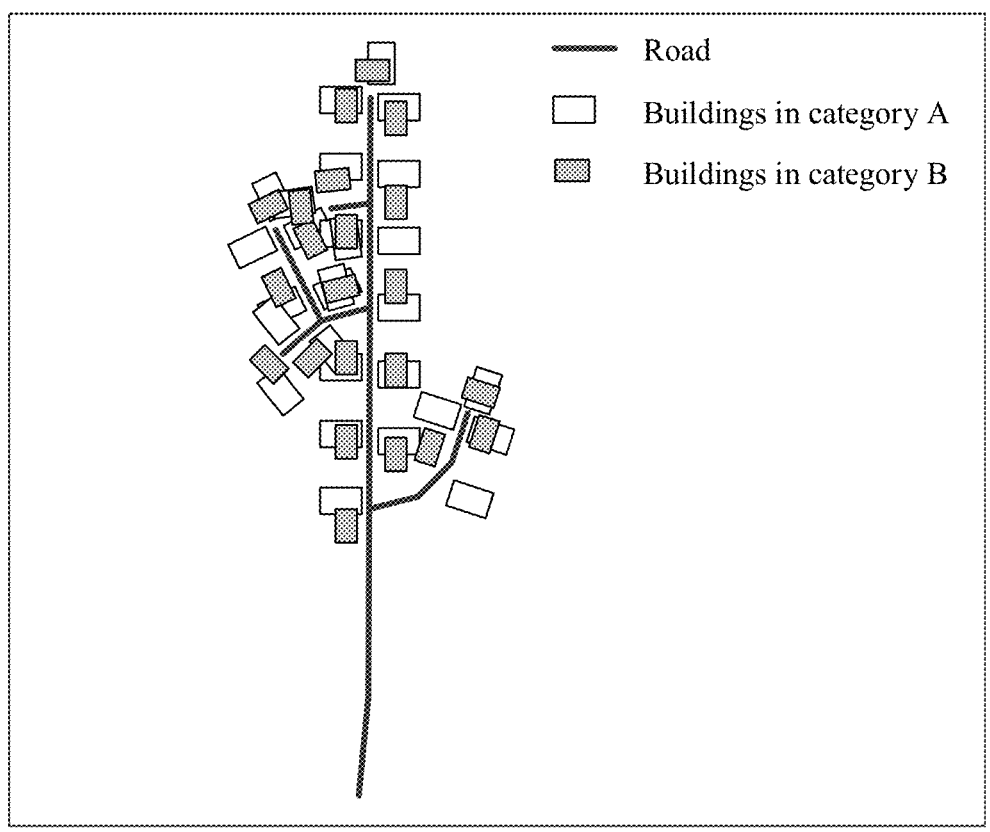
FIG. 12 is a schematic diagram of a road network with target buildings screened based on object density constraint parameters according to an embodiment of the present disclosure.

Refer to FIG. 12, and FIG. 12 shows, on the basis of FIG. 11, a result presented after screening the alternative buildings of different categories in FIG. 11. Specifically, in FIG. 11, corresponding object density constraint parameters are set to the buildings of different categories, if the current density of the alternative buildings in a certain category does not conform to the corresponding object density constraint parameters, for example, the current density is far greater than the object density constraint parameters, the alternative buildings in the category are deleted based on the object density constraint parameters so as to screen the alternative buildings in the category, and the target buildings remaining after screening are obtained shown in FIG. 12.

106: Match the target scenario object with the division marking data so as to generate the target virtual scenario.

Through the above steps, after the candidate scenario objects are determined from the scenario object collection and the target scenario objects are further determined, the step of collision detection between the target scenario objects may be included since a collision phenomenon may exist between the target scenario objects Specifically, the step of matching the target scenario objects with the division marking data so as to generate the target virtual scenario may include the following steps:

Sort the target scenario objects so as to determine a priority level of the target scenario objects.

Perform collision detection on the target scenario objects according to the priority level.

Match the target scenario objects passing collision detection with the division marking data so as to generate the target virtual scenario.

For the division marking data, the target scenario objects selected from the candidate scenario objects still have the problem of being too dense probably, for example, if the buildings are arranged in the road network in FIG. 12, the buildings still have the problem of being too dense in FIG. 12. Thus, the priority level of the target scenario objects is determined by sorting the target scenario objects so as to later select the target scenario objects allocated to the division marking data based on the priority level of the target scenario objects, for example, the target scenario objects with the high priority level may be allocated to the division marking data on the premise of limited density.

Wherein, there may be many ways for sorting the target scenario objects, such as sorting the target scenario objects based on object attributes of the target scenario objects, sorting the buildings based on occupied areas of the buildings when the target scenario objects are the buildings, sorting the target scenario objects based on the object categories of the target scenario objects, and stipulating the residential buildings to be with a higher priority level than the medical buildings when the target scenario objects are the buildings.

After the target scenario objects are sorted to obtain the priority level of the target scenario objects, the target scenario objects allocated to the division marking data may be further determined by performing collision detection between the target scenario objects based on the priority level. Specifically, the step of performing collision detection on the target scenario objects according to the priority level may include the following steps:

Perform collision detection on the target scenario objects belonging to the same object category.

Screen the target scenario objects corresponding to the object category based on a detection result to obtain the target scenario objects remaining after screening.

Determine the target scenario objects passing collision detection from the target scenario objects remaining after screening based on the priority level of the target scenario objects remaining after screening.

It's worth noting that collision detection on the target scenario objects belonging to the same object category may aim for acquisition of the collision situation of the target scenario objects in the object category, and thus, the detection result is related information for representing a collision degree or an overlapping degree between the target scenario objects in the object category.

Furthermore, the target scenario objects in the object category may be screened on the basis of the detection result, for example, the more target scenario objects may be eliminated when the collision degree is serious, and thus the problem that the target scenario objects allocated to the division marking data are too dense is avoided.

In an embodiment, scenario objects may be buildings, a current collision situation of target buildings of categories is acquired by performing collision detection on the target buildings of various categories on the basis of the target buildings obtained after screening the alternative buildings shown in FIG. 12, and the target buildings in the categories are further screened on the basis of the collision situation so as to solve the problem that the buildings are too dense. If the current collision situation of a certain category of the target buildings is serious, a large eliminating proportion is set for the target buildings in the category.

Figure 13:
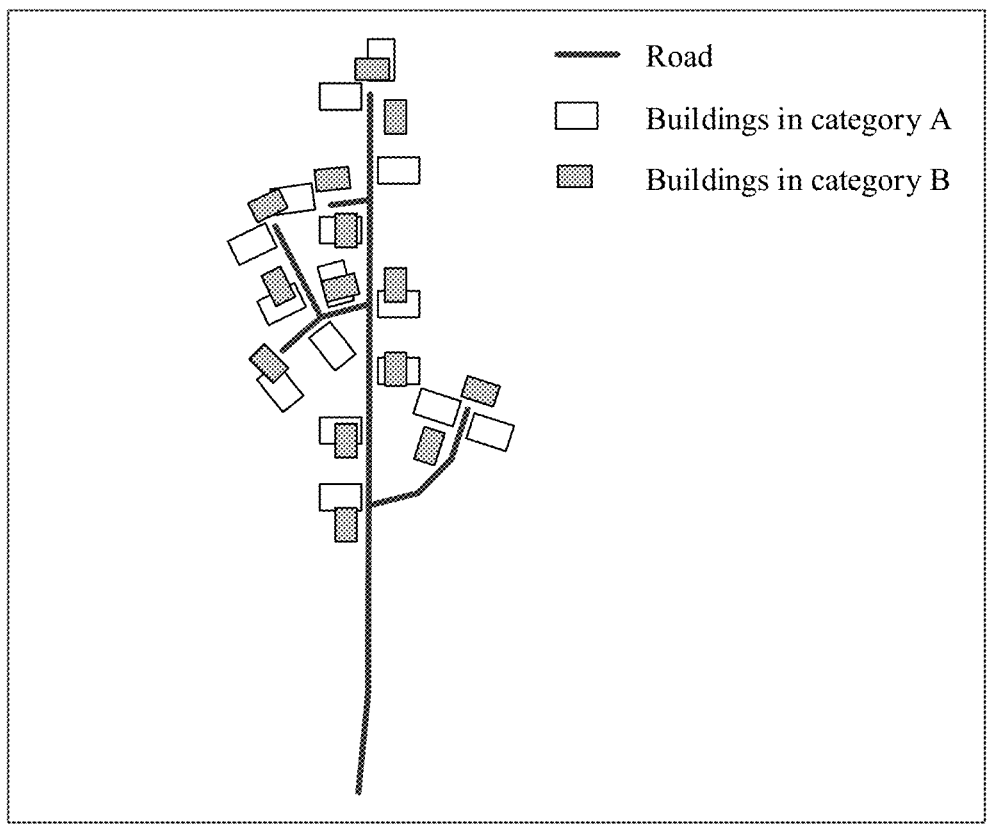
FIG. 13 is a schematic diagram of a road network obtained after eliminating 50% of target buildings in each category in FIG. 12 according to an embodiment of the present disclosure.

For another example, the same eliminating proportion may be used for eliminating the target buildings in various categories, and specifically, referring to FIG. 13, FIG. 13 shows an effect of the target buildings remaining after eliminating 50% of the target buildings in various categories in FIG. 12.

Furthermore, the target scenario objects passing detection are determined from the target scenario objects remaining after screening based on the priority level of the target scenario objects remaining after screening. For example, it can be known by referring to FIG. 13 that a collision problem still exists between the remaining target buildings even after 50% of the target buildings in various categories are eliminated. In other words, there is still a collision problem between the target scenario objects even though the number of the target scenario objects can be effectively reduced into a narrower interval through a multi-time screening mode. Thus, the target scenario objects finally allocated to the division marking data may be selected from the remaining target scenario objects according to the priority level of the target scenario objects.

Figure 14:
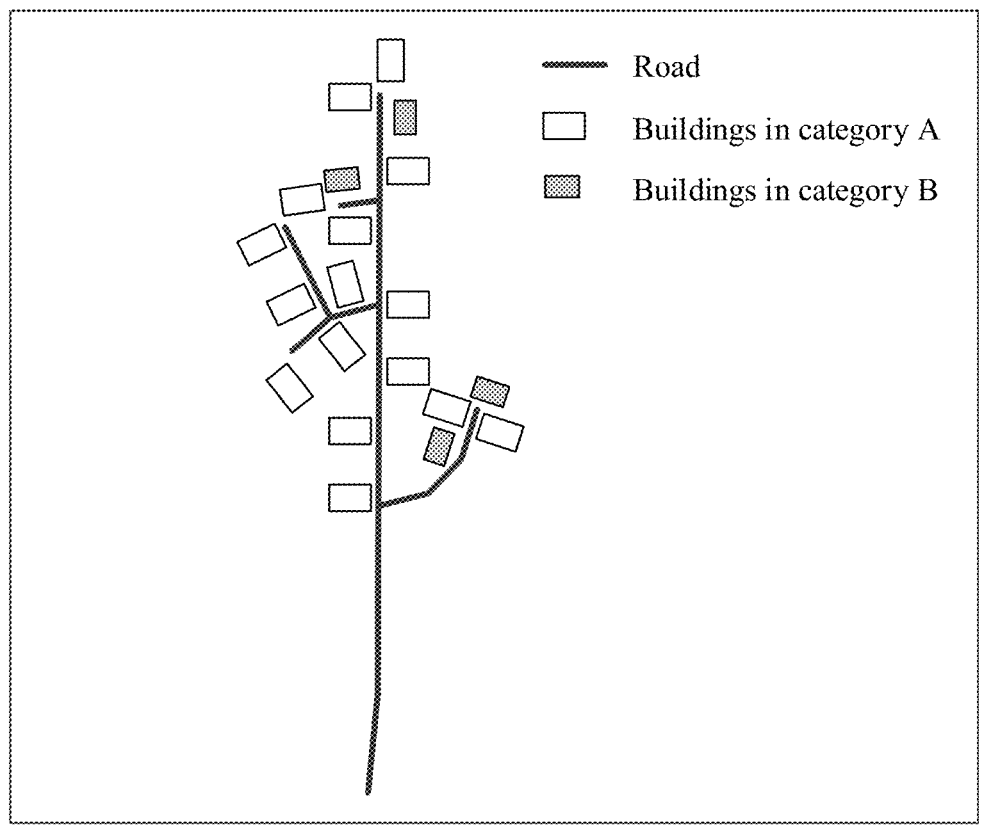
FIG. 14 is a schematic diagram of a road network with target buildings screened based on a priority level according to an embodiment of the present disclosure.

For example, the target scenario objects with the highest priority level may be determined as the target scenario objects finally passing detection. As an example, it can be known by referring to FIG. 13 that there is still a phenomenon of a collision problem between the multiple target buildings, thus, only the target buildings with the highest priory level are preserved while other target buildings are eliminated in the area with the collision problem, namely the area where the overlapped target buildings, for example, the buildings represented by the white rectangles may be set with a higher priory level than the buildings represented by the gray rectangles, and therefore the buildings with the higher priority level are preserved when the collision problem exists between the buildings of different categories, thereby solving the problem and generating a final effect shown in FIG. 14.

In conclusion, the embodiment can greatly improve the virtual scenario generation efficiency, specifically, a scheme may generate the scenario division mesh conforming to the scenario characteristics based on the scenario characteristic information of the to-be-generated target virtual scenario, and therefore the target virtual scenario finally generated on the basis of the scenario division mesh may have a high simulation degree and credibility. In addition, the scheme considers both an attribute matching degree between the scenario objects and the division marking data and position associated information between the scenario objects and the division marking data in a process of allocating the scenario objects to the division marking data in the scenario division mesh, which can efficiently determine the positions where the scenario objects need to be placed in the scenario division mesh and can effectively solve a problem of a false scenario caused by position overlapping or object colliding in the scenario generation process.

In addition, the user only needs to provide the scenario characteristic information for describing the to-be-generated target virtual scenario and the submodules of the to-be-assembled scenario objects in the scheme so that the complete and vivid virtual scenario can be programmatically generated through the scheme, thereby greatly improving a virtual scenario generation convenience degree and automation degree.

According to the method described in the foregoing embodiments, the following further provides detailed descriptions by using examples.

In the embodiment, integrating a virtual scenario generation apparatus in a server is exemplarily described, and the server may be a single server and may also be a server cluster composed of a plurality of servers; and a terminal may be a mobile phone, a tablet personal computer, a notebook computer and other devices.

Figure 15:
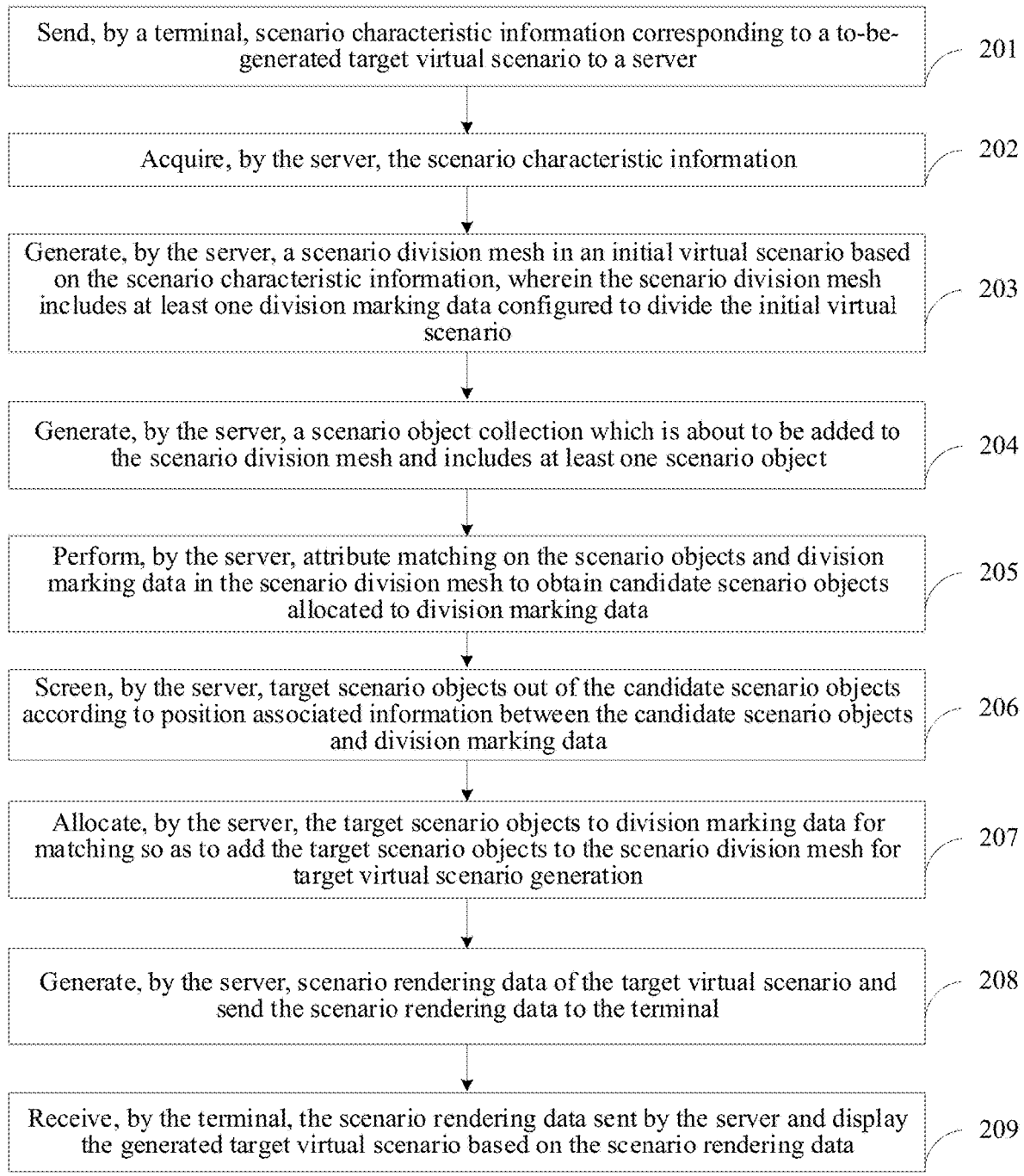
FIG. 15 is another schematic flowchart of a virtual scenario generation method according to an embodiment of the present disclosure.

As shown in FIG. 15, a virtual scenario generation method includes the following specific process:

201: Send, by the terminal, scenario characteristic information corresponding to a to-be-generated target virtual scenario to the server.

In the embodiment, the virtual scenario generation method may be applied to game development for virtual city generation. The terminal may send the corresponding scenario characteristic information for describing the to-be-generated virtual city to the server, such as population density distribution data.

202: Acquire, by the server, the scenario characteristic information.

203: Generate, by the server, a scenario division mesh in an initial virtual scenario based on the scenario characteristic information, wherein the scenario division mesh includes at least one division marking data configured to divide the initial virtual scenario.

Figure 16:
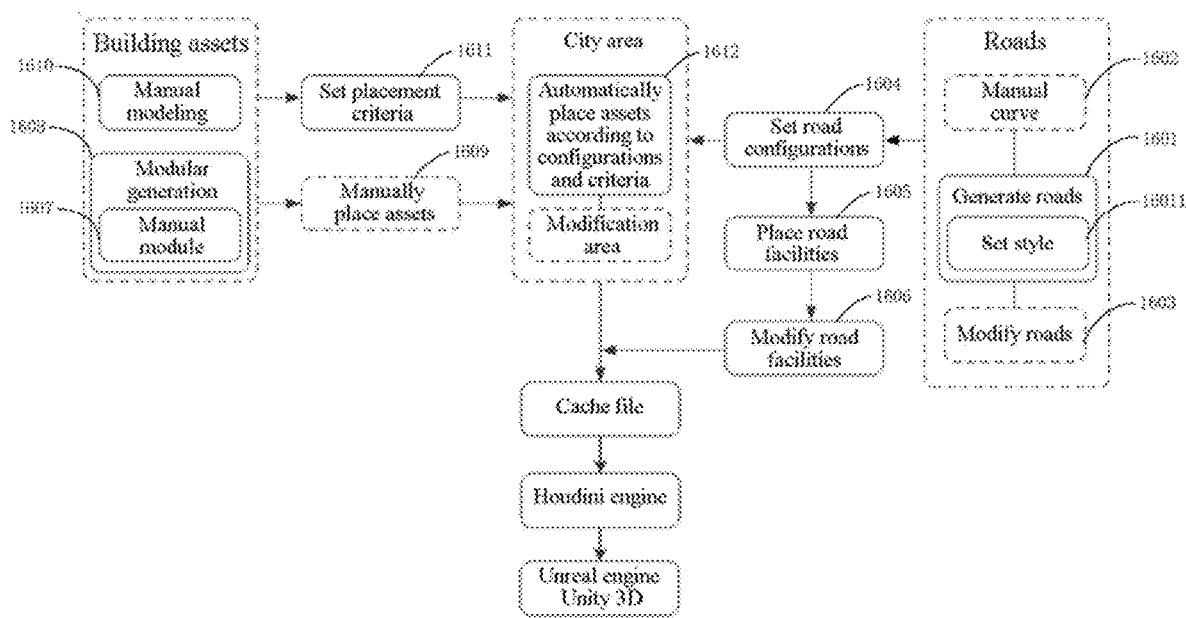
FIG. 16 is a schematic flowchart of city road generation in Houdini software according to an embodiment of the present disclosure.

In an embodiment, referring to FIG. 16, a server may generate a city road 1601 in Houdini software, for example, a scenario division mesh, namely a city road network may be generated after a road style 16011 is set. It's worth noting that Houdini further provides a curve 1602 for manual road generation and a function for road modification 1603.

In addition, the server may set corresponding configurations 1604 such as road attributes for roads in the city road network, and furthermore, the server may set road facility placement 1605 such as garbage cans and benches. In some embodiments, a function of road facility modification 1606 may be further included.

204: Generate, by the server, a scenario object collection which is about to be added to the scenario division mesh and includes at least one scenario object.

In an embodiment, referring to FIG. 16, the server may modularly generate building assets 1608 by combining building submodules 1607 obtained via manual modeling, thereby generating a building collection which is about to be added to the city road network. Furthermore, the server may perform manual placement 1609 on the generated building assets.

In some embodiments, buildings may be generated in a mode of manual modeling 1610 so as to obtain the building collection. Furthermore, the server may set corresponding attributes to the generated buildings so as to perform placement criterion set 1611 for the buildings.

205: Perform, by the server, attribute matching on the scenario objects and the division marking data in the scenario division mesh to obtain candidate scenario objects allocated to the division marking data.

In an embodiment, a server may arrange buildings by matching road configurations with a building placement criterion 1612 to obtain alternative buildings allocated to a road.

206: Select, by the server, target scenario objects from the candidate scenario objects according to position associated information between the candidate scenario objects and the division marking data.

In an embodiment, a server performs collision detection on alternative buildings and a road according to position associated information between the alternative buildings and the road, and then performs secondary collision detection on target buildings passing detection so as to screen out final target buildings.

207: Match, by the server, the target scenario objects with the division marking data so as to generate the target virtual scenario.

In an embodiment, a virtual scenario generation method in the embodiment of the present disclosure may be developed into a series of repeatedly-used file formats of Houdini Digital Asset (HDA) in Houdini so as to be used by game projects needing virtual cities, and referring to FIG. 16, after the road configurations and the building asset placement criterion are set, the assets 1612 can be automatically arranged according to the configurations and the criterion, thereby executing step 205, step 206 and step 207. Furthermore, modification 1613 may be performed on some areas.

Figure 17:
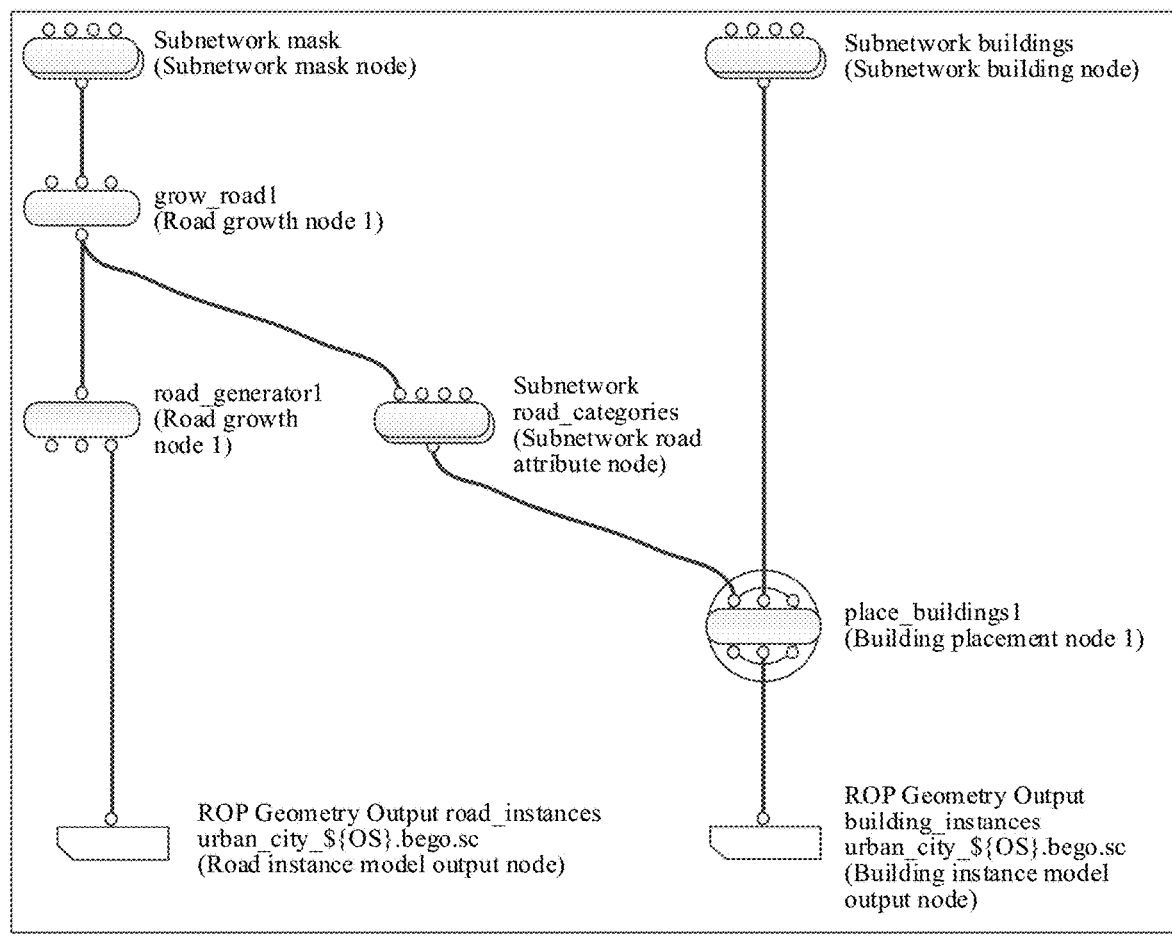
FIG. 17 is a schematic diagram of a node network used through connection in Houdini according to an embodiment of the present disclosure.
Figure 18:
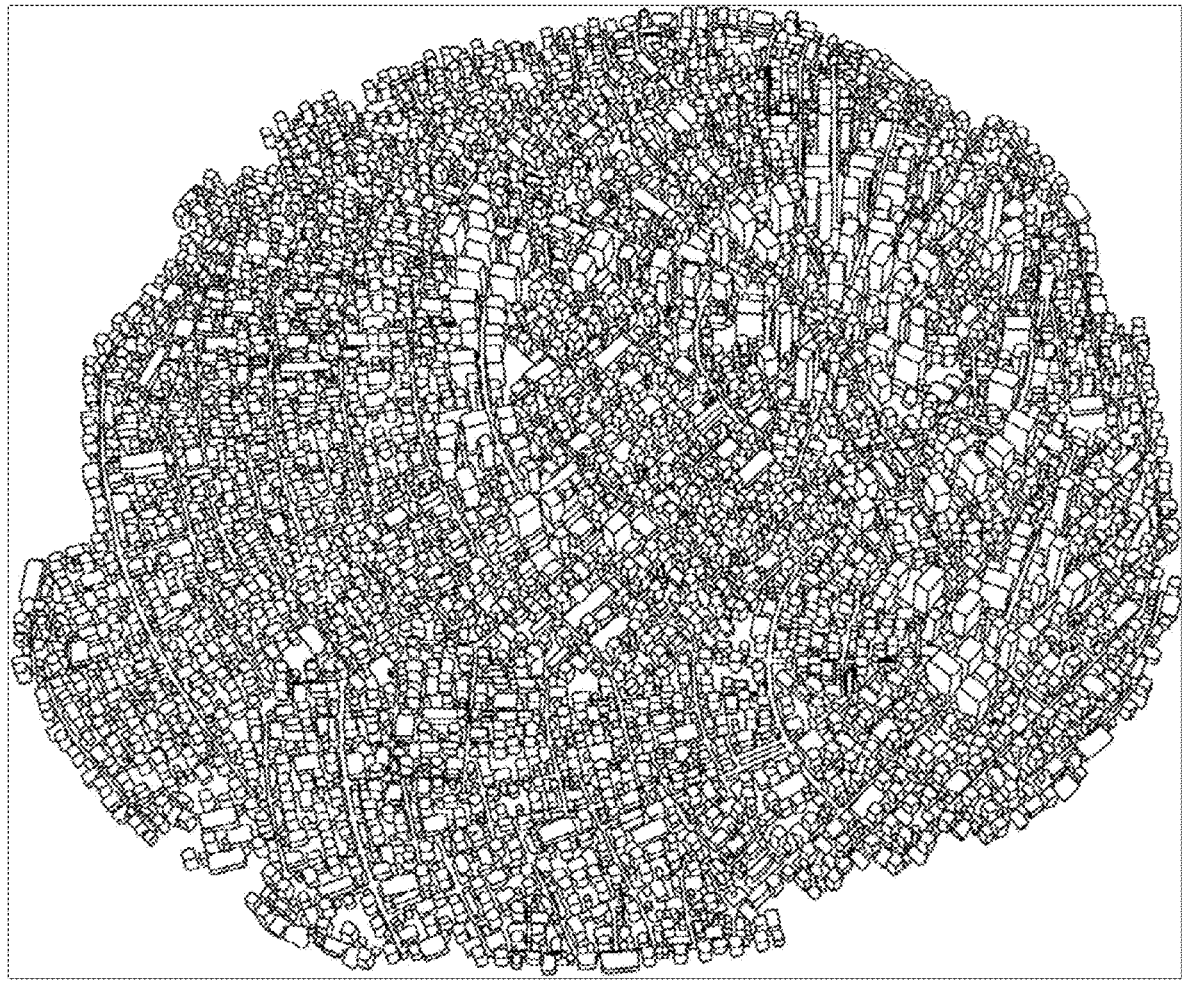
FIG. 18 is a schematic diagram of a virtual city according to an embodiment of the present disclosure.
Figure 19:
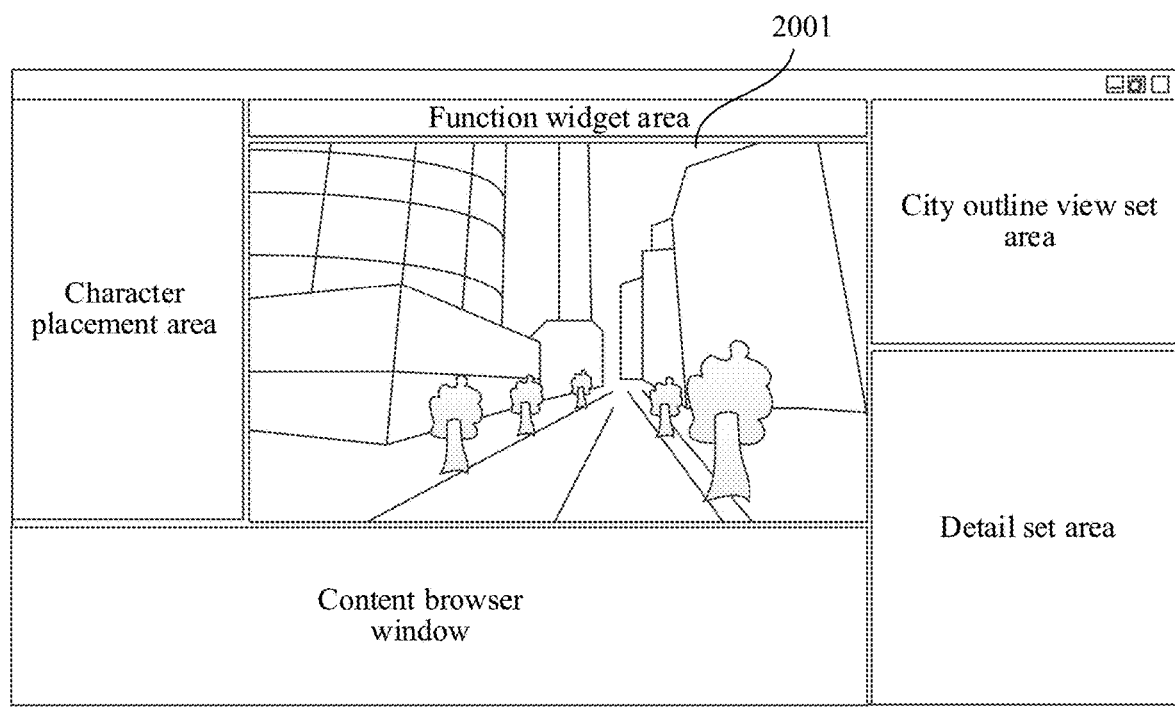
FIG. 19 is a schematic diagram of a virtual city presented in a game Unreal Engine according to an embodiment of the present disclosure.

Wherein, FIG. 17 is a node network used after HDAs are connected, including subnetwork mask nodes, road growth nodes, subnetwork road attribute nodes, subnetwork building nodes, building placement nodes, road instance model output nodes and building instance model output nodes. A virtual city obtained after generation of the node network is shown in FIG. 18, and furthermore, an effect presented in a game Unreal Engine is shown in 2001 in FIG. 19.

208: Generate, by the server, scenario rendering data of the target virtual scenario and send the scenario rendering data to the terminal.

For example, referring to FIG. 16, the server may save the scenario rendering data in a form of a cache file 1614 so that the terminal can show the target virtual scenario, on the basis of the cache file, generated by the server.

209: Receive, by the terminal, the scenario rendering data sent by the server and display the generated target virtual scenario based on the scenario rendering data.

For example, referring to FIG. 16, besides a Houdini engine 1615, an Unreal software engine 1616 or Unity 3D software 1616 may run on the terminal. In addition, after receiving the scenario rendering data, the terminal may display the virtual city generated via rendering of the server shown in FIG. 18 or FIG. 19 on the basis of the scenario rendering data.

When the above scheme is applied to game APP for virtual city generation and achieved by Houdini, abundant modeling functions of Houdini may be utilized, thereby reducing game 3D art learning costs and improving controllability. For example, operating efficiency of a model of a building module may be optimized to the maximum in a game engine, operating efficiency of output of the building module may be improved by utilizing a specific technology of the engine for a wide-range scenario, and a building placement algorithm may improve manufacturing efficiency based on existing art assets of the engine.

Figure 20:
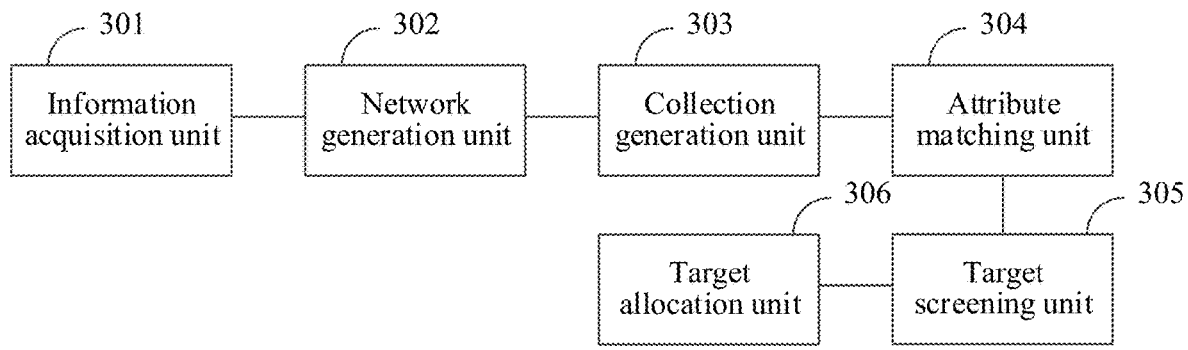
FIG. 20 is a schematic structural diagram of a virtual scenario generation apparatus according to an embodiment of the present disclosure.

To better implementing the above method, correspondingly, the embodiment of the present disclosure further provides a virtual scenario generation apparatus capable of being integrated in a server or a terminal. The server may be a single server, or a server cluster composed of a plurality of servers; and the terminal may be a mobile phone, a tablet personal computer, a notebook computer and other devices. As shown in FIG. 20, the virtual scenario generation apparatus may include an information acquisition unit 301, a network generation unit 302, a collection generation unit 303, an attribute matching unit 304, a target screening unit 305 and a target allocation unit 306, shown as below:

the information acquisition unit 301 is configured to acquire scenario characteristic information corresponding to a to-be-generated target virtual scenario;

the network generation unit 302 is configured to generate a scenario division mesh in an initial virtual scenario based on the scenario characteristic information, wherein the scenario division mesh may include at least one division marking data configured to divide the initial virtual scenario;

the collection generation unit 303 configured to generate a scenario object collection which is about to be added to the scenario division mesh and may include at least one scenario object;

the attribute matching unit 304 configured to perform attribute matching on the scenario objects and the division marking data to obtain candidate scenario objects allocated to the division marking data;

the target screening unit 305 configured to select target scenario objects from the candidate scenario objects according to position associated information between the candidate scenario objects and the division marking data; and the target allocation unit 306 configured to match the target scenario objects with the division marking data so as to generate the target virtual scenario.

Figure 21:
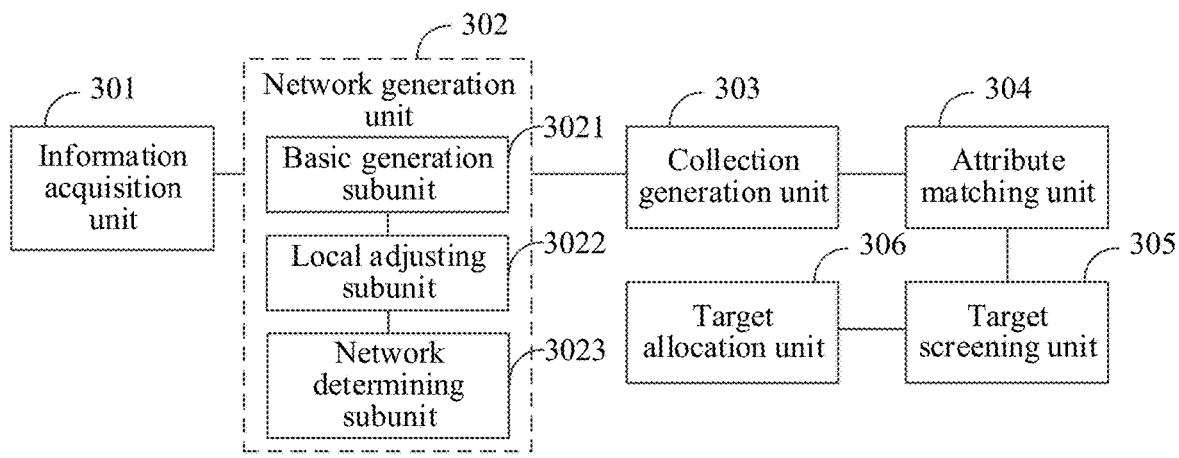
FIG. 21 is another schematic structural diagram of a virtual scenario generation apparatus according to an embodiment of the present disclosure.

In an embodiment, referring to FIG. 21, division marking data are division lines, and a network generation unit 302 may include:

a basic generation subunit 3021 configured to generate a basic division mesh in an initial virtual scenario based on scenario characteristic information, wherein the basic division mesh includes at least one to-be-adjusted division line;

a local adjusting subunit 3022 configured to adjust the to-be-adjusted division lines based on line intersection information of the to-be-adjusted division lines in the basic division mesh to obtain adjusted division lines; and a network determining subunit 3023 configured to determine the scenario division mesh according to the adjusted division lines.

In an embodiment, a basic generation subunit 3021 may be configured to:

determine a line distribution pattern needed for generating a basic division mesh; convert scenario characteristic information to obtain tensor information corresponding to the scenario characteristic information; and generate the basic division mesh in an initial virtual scenario based on the line distribution pattern and the tensor information.

In an embodiment, a basic generation subunit 3021 may be specifically configured to:

generate a basic division mesh complying with a line distribution pattern in an initial virtual scenario, wherein the basic division mesh includes at least one to-be-corrected division line; and perform geometric correction on the to-be-corrected division lines according to tensor information to obtain corrected division lines serving as to-be-corrected division lines in the basic division mesh.

In an embodiment, a local adjusting subunit 3022 may be configured to:
determine line constraint rules based on line intersection information and determine to-be-adjusted target division lines; and adjust the target division lines by complying with the line constraint rules to obtain adjusted division lines.

Figure 22:
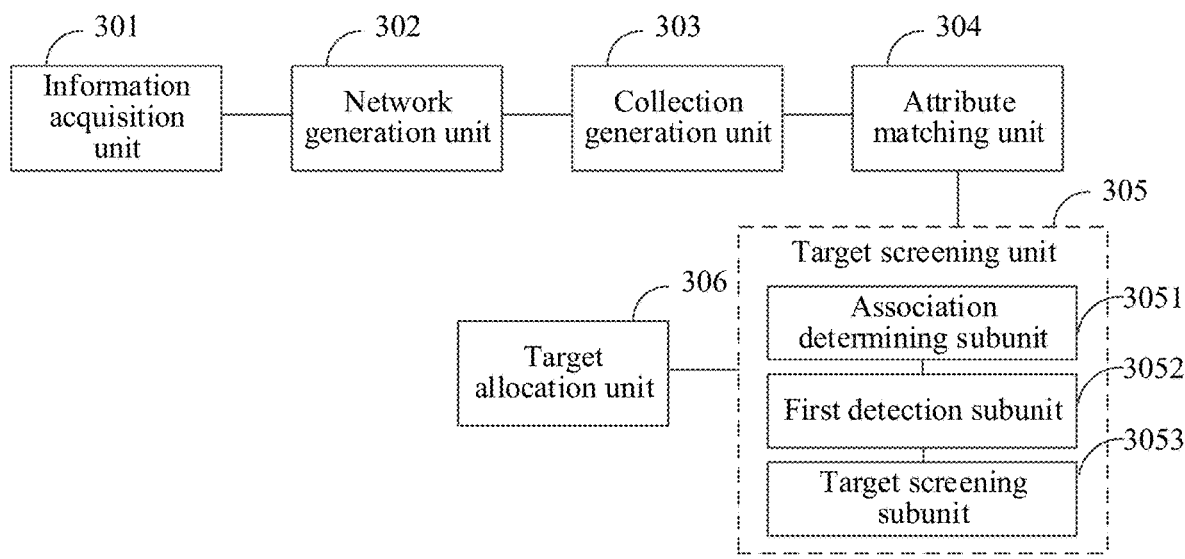
FIG. 22 is another schematic structural diagram of a virtual scenario generation apparatus according to an embodiment of the present disclosure.

In an embodiment, referring to FIG. 22, a target screening unit 305 may include:
an association determining subunit 3051 configured to determine position associated information between candidate scenario objects and division lines based on geometric characteristics of the candidate scenario objects;
a first detection subunit 3052 configured to perform collision detection on the candidate scenario objects and the division lines according to the position associated information; and
a target screening subunit 3053 configured to select target scenario objects allocated to the division lines from the candidate scenario objects passing collision detection.

In an embodiment, a target screening subunit 3053 may be configured to:
determine object categories of candidate scenario objects passing collision detection, wherein the object categories have corresponding object density constraint parameters; and screen, on the basis of the object density constraint parameters, the candidate scenario objects in the object categories and obtain target scenario objects remaining after screening to be allocated to division lines.

Figure 23:
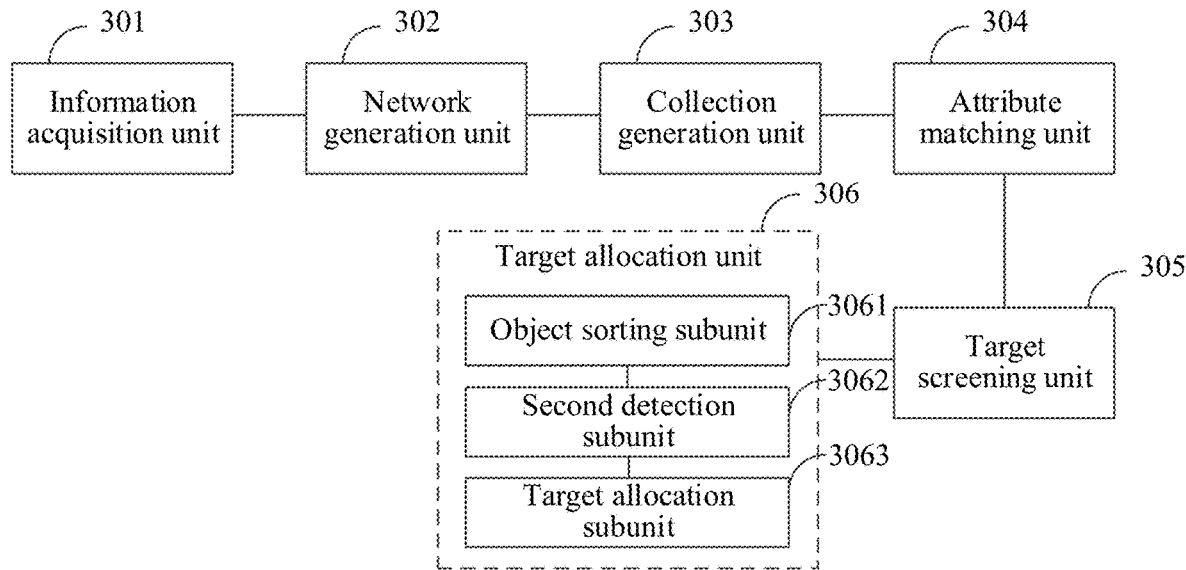
FIG. 23 is another schematic structural diagram of a virtual scenario generation apparatus according to an embodiment of the present disclosure.

In an embodiment, referring to FIG. 23, a target allocation unit 306 may include:
an object sorting subunit 3061 configured to sort target scenario objects so as to determine a priority level of the target scenario objects;
a second detection subunit 3062 configured to perform collision detection on the target scenario objects according to the priority level; and
a target allocation subunit 3063 configured to match the target scenario objects passing collision detection with division marking data so as to generate a target virtual scenario.

In an embodiment, a second detection subunit 3062 may be configured to:
perform collision detection on target scenario objects belonging to the same object category; screen the target scenario objects corresponding to the object category based on a detection result to obtain target scenario objects remaining after screening; and determine target scenario objects passing collision detection from the target scenario objects remaining after screening based on a priority level of the target scenario objects remaining after screening.

Figure 24:
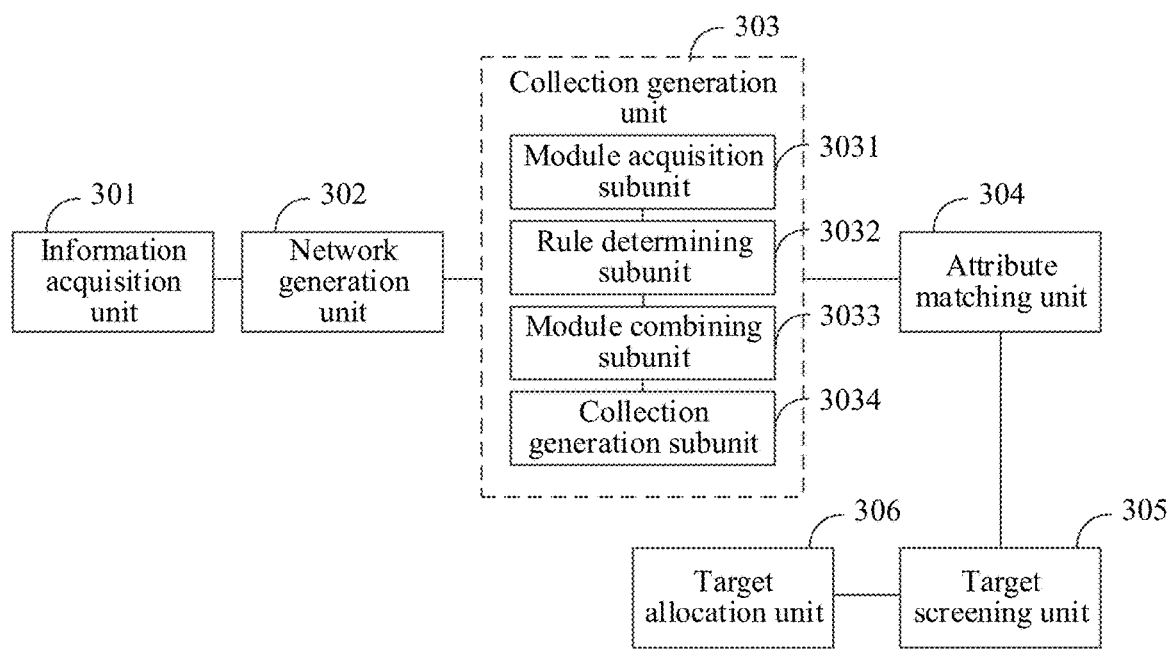
FIG. 24 is another schematic structural diagram of a virtual scenario generation apparatus according to an embodiment of the present disclosure.

In an embodiment, referring to FIG. 24, a collection generation unit 303 may include:
a module acquisition subunit 3031 configured to acquire submodules of to-be-generated scenario objects;
a rule determining subunit 3032 configured to determine a combination rule corresponding to the submodules;
a module combining subunit 3033 configured to perform module combination on the submodules to obtain a combined scenario object based on module parameters of the submodules and the combination rule; and
a collection generation subunit 3034 configured to generate a scenario object collection according to the combined scenario object.

Figure 25:
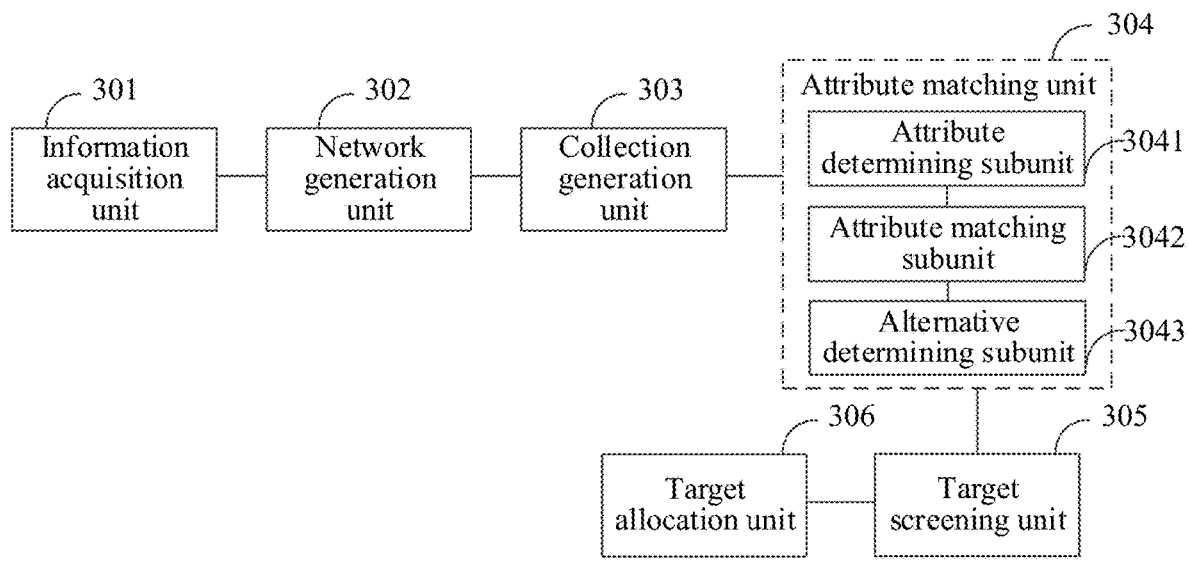
FIG. 25 is another schematic structural diagram of a virtual scenario generation apparatus according to an embodiment of the present disclosure.

In an embodiment, referring to FIG. 25, an attribute matching unit 304 may include:
an attribute determining subunit 3041 configured to determine object attributes of scenario objects and line attributes of division marking data;
an attribute matching subunit 3042 configured to perform attribute matching on the object attributes and the line attributes; and
an alternative determining subunit 3043 configured to determine the scenario objects passing matching as candidate scenario objects allocated to the division marking data.

Figure 26:
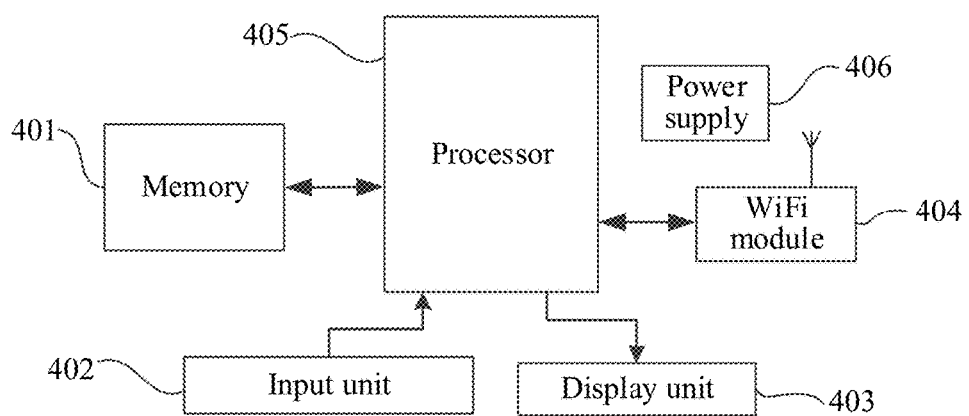
FIG. 26 is a schematic structural diagram of an electronic device according to an embodiment of the present disclosure.

In addition, an embodiment of the present disclosure further provides an electronic device, and the electronic device may be a server or a terminal. FIG. 26 is a schematic structural diagram of an electronic device according to an embodiment of the present disclosure. Specifically, the electronic device including one or more computer readable storage media 401, an input unit 402, a display unit 403, a wireless fidelity (Wi-Fi) module 404, a processor 405 including one or more processing cores, and a power supply 406. where The memory 401 may be configured to store a software program and a module, and the processor 405 runs the software program and the module that are stored in the memory 401, to implement various functional applications and data processing. The memory 401 may include a high speed random access memory, and may further include a non-volatile memory, such as at least one magnetic disk storage device, a flash storage device, or another volatile solid-state storage device. Correspondingly, the memory 401 may further include a memory controller, so as to provide access of the processor 405 and the input unit 402 to the memory 401.

The input unit 402 may receive input digit or character information, and generate keyboard, mouse, joystick, optical, or track ball signal input related to the user setting and function control.

The display unit 403 may be configured to display information input by the user or information provided for the user, and various graphical user interfaces of the electronic device. The graphical user interfaces may be formed by a graph, a text, an icon, a video, or any combination thereof.

The processor 405 is a control center of the electronic device, which is connected to various parts of the entire mobile phone by using various interfaces and lines, and by running or executing a software program and/or module stored in the memory 401 and calling data stored in the memory 401, to implement various functions of the electronic device and process data, so as to perform overall monitoring on the mobile phone.

The electronic device further includes the power supply 406 (such as a battery) for supplying power to the components. Preferably, the power supply may logically connect to the processor 405 by using a power supply management system, thereby implementing functions, such as charging, discharging, and power consumption management, by using the power supply management system.

A person of ordinary skill in the art could understand that, all or some steps of various methods in the embodiments may be implemented through instructions, or implemented through instructions controlling relevant hardware, and the instructions may be stored in a computer-readable storage medium and loaded and executed by a processor.

Accordingly, the embodiments of the present disclosure provide a computer-readable storage medium, storing a plurality of instructions, the instructions being loaded by a processor, to perform the steps in any one of the virtual scenario generation method according to the embodiments of the present disclosure. The storage medium may include: a read-only memory (ROM), a random access memory (RAM), a magnetic disk, an optical disc or the like.

An aspect of the embodiments of the present disclosure provides a computer program product or a computer program, the computer program product or the computer program including computer instructions, the computer instructions being stored in a computer-readable storage medium. A processor of a computer device reads the computer instructions from the computer-readable storage medium, and executes the computer instructions, so that the computer device performs the method provided in the various optional implementations in the foregoing virtual scenario method aspects.

The virtual scenario generation method and apparatus, the device, and the storage medium provided in the embodiments of the present disclosure are described above in detail. Although the principles and implementations of the present disclosure are described by using specific examples in this specification, the descriptions of the foregoing embodiments are merely intended to help understand the method and the core idea of the method of the present disclosure. Meanwhile, a person skilled in the art may make modifications to the specific implementations and application range according to the idea of the present disclosure. In conclusion, the content of this specification is not to be construed as a limitation to the present disclosure.

What is claimed is:

1. A virtual scenario generation method, executed by an electronic device, comprising:
    acquiring scenario characteristic information corresponding to a target virtual scenario to be generated;
    generating a scenario division mesh in an initial virtual scenario based on the scenario characteristic information, the scenario division mesh comprising division marking data configured to divide the initial virtual scenario;
    generating a scenario object collection which is about to be added to the scenario division mesh and comprises one or more scenario objects;
    performing attribute matching on the one or more scenario objects and the division marking data to obtain one or more candidate scenario objects allocated to the division marking data;
    selecting a target scenario object from the one or more candidate scenario objects according to position associated information between the candidate scenario objects and the division marking data; and
    matching the target scenario object with the division marking data to generate the target virtual scenario.

2. The virtual scenario generation method according to claim 1, wherein the division marking data include division lines, and the generating a scenario division mesh in an initial virtual scenario based on the scenario characteristic information comprises:
    generating a basic division mesh in the initial virtual scenario based on the scenario characteristic information, the basic division mesh comprising a first division line to be adjusted;
    adjusting the first division line based on line intersection information of the first division line in the basic division mesh to obtain an adjusted division line; and
    determining the scenario division mesh according to the adjusted division line.

3. The virtual scenario generation method according to claim 2, wherein the generating a basic division mesh in the initial virtual scenario based on the scenario characteristic information comprises:
    determining a line distribution pattern for generating the basic division mesh;
    converting the scenario characteristic information to obtain tensor information corresponding to the scenario characteristic information; and
    generating the basic division mesh in the initial virtual scenario based on the line distribution pattern and the tensor information.

4. The virtual scenario generation method according to claim 3, wherein the generating the basic division mesh in the initial virtual scenario based on the line distribution pattern and the tensor information comprises:
    generating the basic division mesh complying with the line distribution pattern in the initial virtual scenario, the basic division mesh comprising a second division line to be corrected; and
    performing geometric correction on the second division line according to the tensor information to obtain a corrected division line as the first division line to be adjusted in the basic division mesh.

5. The virtual scenario generation method according to claim 2, wherein the adjusting the first division line based on line intersection information of the first division line in the basic division mesh to obtain an adjusted division line comprises:
    determining a line constraint rule based on the line intersection information and determining a target division line to be adjusted; and
    adjusting the target division line according to the line constraint rule.

6. The virtual scenario generation method according to claim 1, wherein the division marking data include division lines, and the selecting a target scenario object from the one or more candidate scenario objects according to position associated information between the one or more candidate scenario objects and the division marking data comprises:
    determining the position associated information between the one or more candidate scenario objects and the division lines based on geometric characteristics of the one or more candidate scenario objects;
    performing collision detection on the one or more candidate scenario objects and the division lines according to the position associated information; and
    selecting the target scenario object allocated to the division lines from the one or more candidate scenario objects passing collision detection.

7. The virtual scenario generation method according to claim 6, wherein the selecting the target scenario object allocated to the division lines from the one or more candidate scenario objects passing collision detection comprises:
    determining object categories of the one or more candidate scenario objects passing collision detection, the object categories having corresponding object density constraint parameters; and
    screening the one or more candidate scenario objects in the object categories according to the object density constraint parameters to obtain the target scenario object remaining after screening to be allocated to the division lines.

8. The virtual scenario generation method according to claim 1, wherein a plurality of target scenario objects are selected, and the matching the target scenario object with the division marking data to generate the target virtual scenario comprises:

sorting the target scenario objects to determine priority levels of the target scenario objects;

performing collision detection on the target scenario objects according to the priority levels; and matching a first target scenario object passing collision detection with the division marking data to generate the target virtual scenario.

9. The virtual scenario generation method according to claim 8, wherein the performing collision detection on the target scenario object according to the priority level comprises:

performing collision detection on the target scenario objects belonging to a same object category;

determining one or more target scenario objects corresponding to the object category passing the collision detection based on a detection result; and determining the first target scenario object from the one or more target scenario objects passing the collision detection based on the priority levels of the one or more target scenario objects.

10. The virtual scenario generation method according to claim 1, wherein the generating a scenario object collection which is about to be added to the scenario division mesh comprises:

acquiring submodules of scenario objects to be generated;

determining a combination rule corresponding to the submodules;

performing module combination on the submodules to obtain a combined scenario object based on module parameters of the submodules and the combination rule; and generating the scenario object collection according to the combined scenario object.

11. The virtual scenario generation method according to claim 1, wherein the performing attribute matching on the scenario objects and the division marking data to obtain one or more candidate scenario objects allocated to the division marking data comprises:

determining object attributes of the scenario objects and line attributes of the division marking data;

performing attribute matching on the object attributes and the line attributes; and determining the scenario objects passing matching as the one or more candidate scenario objects allocated to the division marking data.

12. A virtual scenario generation apparatus, comprising:

a memory and a processor, the memory storing an application program, the processor being configured to run the application program in the memory to perform:

acquiring scenario characteristic information corresponding to a target virtual scenario to be generated;

generating a scenario division mesh in an initial virtual scenario based on the scenario characteristic information, the scenario division mesh comprising division marking data configured to divide the initial virtual scenario;

generating a scenario object collection which is about to be added to the scenario division mesh and comprises one or more scenario objects;

performing attribute matching on the one or more scenario objects and the division marking data to obtain one or more candidate scenario objects allocated to the division marking data;

selecting a target scenario object from the one or more candidate scenario objects according to position associated information between the candidate scenario objects and the division marking data; and matching the target scenario object with the division marking data to generate the target virtual scenario.

13. The virtual scenario generation apparatus according to claim 12, wherein the division marking data include division lines, and the generating a scenario division mesh in an initial virtual scenario based on the scenario characteristic information comprises:

generating a basic division mesh in the initial virtual scenario based on the scenario characteristic information, the basic division mesh comprising a first division line to be adjusted;

adjusting the first division line based on line intersection information of the first division line in the basic division mesh to obtain an adjusted division line; and determining the scenario division mesh according to the adjusted division line.

14. The virtual scenario generation apparatus according to claim 13, wherein the generating a basic division mesh in the initial virtual scenario based on the scenario characteristic information comprises:

determining a line distribution pattern for generating the basic division mesh;

converting the scenario characteristic information to obtain tensor information corresponding to the scenario characteristic information; and generating the basic division mesh in the initial virtual scenario based on the line distribution pattern and the tensor information.

15. The virtual scenario generation apparatus according to claim 14, wherein the generating the basic division mesh in the initial virtual scenario based on the line distribution pattern and the tensor information comprises:

generating the basic division mesh complying with the line distribution pattern in the initial virtual scenario, the basic division mesh comprising a second division line to be corrected; and performing geometric correction on the second division line according to the tensor information to obtain a corrected division line as the first division line to be adjusted in the basic division mesh.

16. The virtual scenario generation apparatus according to claim 13, wherein the adjusting the first division line based on line intersection information of the first division line in the basic division mesh to obtain an adjusted division line comprises:

determining a line constraint rule based on the line intersection information and determining a target division line to be adjusted; and adjusting the target division line according to the line constraint rule.

17. The virtual scenario generation apparatus according to claim 12, wherein the division marking data include division lines, and the selecting a target scenario object from the one or more candidate scenario objects according to position associated information between the one or more candidate scenario objects and the division marking data comprises:

determining the position associated information between the one or more candidate scenario objects and the division lines based on geometric characteristics of the one or more candidate scenario objects;

performing collision detection on the one or more candidate scenario objects and the division lines according to the position associated information; and selecting the target scenario object allocated to the division lines from the one or more candidate scenario objects passing collision detection.

18. The virtual scenario generation apparatus according to claim 17, wherein the selecting the target scenario object allocated to the division lines from the one or more candidate scenario objects passing collision detection comprises:
   determining object categories of the one or more candidate scenario objects passing collision detection, the object categories having corresponding object density constraint parameters; and
   screening the one or more candidate scenario objects in the object categories according to the object density constraint parameters to obtain the target scenario object remaining after screening to be allocated to the division lines.

19. The virtual scenario generation apparatus according to claim 12, wherein a plurality of target scenario objects are selected, and the matching the target scenario object with the division marking data to generate the target virtual scenario comprises:
   sorting the target scenario objects to determine priority levels of the target scenario objects;
   performing collision detection on the target scenario objects according to the priority levels; and
   matching a first target scenario object passing collision detection with the division marking data to generate the target virtual scenario.

20. A non-transitory computer-readable storage medium, storing a plurality of instructions, the instructions being configured to be loaded by a processor, to perform:
   acquiring scenario characteristic information corresponding to a target virtual scenario to be generated;
   generating a scenario division mesh in an initial virtual scenario based on the scenario characteristic information, the scenario division mesh comprising division marking data configured to divide the initial virtual scenario;
   generating a scenario object collection which is about to be added to the scenario division mesh and comprises one or more scenario objects;
   performing attribute matching on the one or more scenario objects and the division marking data to obtain one or more candidate scenario objects allocated to the division marking data;
   selecting a target scenario object from the one or more candidate scenario objects according to position associated information between the candidate scenario objects and the division marking data; and
   matching the target scenario object with the division marking data to generate the target virtual scenario.

* * * * *